(12) United States Patent
Jawdat

(10) Patent No.: US 10,077,805 B2
(45) Date of Patent: *Sep. 18, 2018

(54) HTS BEARING SYSTEM AND METHOD

(71) Applicant: BenMaan I. Jawdat, Houston, TX (US)

(72) Inventor: BenMaan I. Jawdat, Houston, TX (US)

(73) Assignee: REVTERRA CORPORATION, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/194,476

(22) Filed: Jun. 27, 2016

(65) Prior Publication Data

US 2016/0305478 A1 Oct. 20, 2016

Related U.S. Application Data

(63) Continuation of application No. 14/140,224, filed on Dec. 24, 2013, now Pat. No. 9,404,532.

(60) Provisional application No. 61/844,766, filed on Jul. 10, 2013.

(51) Int. Cl.
*H01F 6/06* (2006.01)
*F16C 32/04* (2006.01)

(52) U.S. Cl.
CPC ...... *F16C 32/0438* (2013.01); *F16C 2326/00* (2013.01); *F16C 2360/00* (2013.01)

(58) Field of Classification Search
CPC .................................................. F16C 32/0438
USPC ....................................................... 505/163
See application file for complete search history.

(56) References Cited

U.S. PATENT DOCUMENTS 6,806,604 B2 * 10/2004 Werfel ...................... B04B 9/12
310/90.5
2011/0089780 A1 * 4/2011 Schwarz ............. F16C 32/0438
310/90.5

OTHER PUBLICATIONS

Lee, E., Ma, K., Wilson, T. L. & Chu, W.-K. Superconductor-magnet bearings with inherent stability and velocity-independent drag torque. at <http://ieeexplore.ieee.org/xpls/abs_all.jsp?arnumber=803276>1999 IEEE/ASME International Conference on Advanced Intelligent Mechatronics (1999).
Liu, M., Wang, S., Wang, J. & Ma, G. Influence of the Air Gap between Adjacent Permanent Magnets on the Performance of NdFeB Guideway for HTS Maglev System. Journal of Superconductivity and Novel Magnetism 21, 431-435 (2008).
Litzkendorf, D. et al. Batch-processing and bonding of melt-textured applications YBCO for motor. 5107, 1-4 (1998).
(Continued)

*Primary Examiner* — Paul A Wartalowicz

(57) ABSTRACT

A superconductor-magnet bearing system can include a first bearing portion and a second bearing portion. One of the first and second bearing portions can be at least partially composed of a high-temperature superconductor (HTS) and another can be at least partially composed of a magnet. The first bearing portion can be disposed at least partially within an opening of the second bearing portion with a gap between the first and second portions. A magnetic bearing portion can include a plurality of rings disposed next to one another. An HTS bearing portion can include a magnet. The bearing portions can be biased toward an alignment with one another. One bearing portion can rotate relative to another bearing portion.

19 Claims, 11 Drawing Sheets

(56) References Cited

OTHER PUBLICATIONS

Roa, J. J. et al. Surface & Coatings Technology Corrosion induced degradation of textured YBCO under operation in high conditions. Surface & Coatings Technology 206, 4256-4261 (2012).
Sriram, M. A., Ponce, L. & Murr, L. E. Modeling superconductor degradation using magnetic levitation. Applied Physics Letters 58, 1208-1210 (1991).
Truchý, M. et al. Studies of $YBa_2Cu_3O_{6+x}$ degradation and surface conductivity properties by Scanning Spreading Resistance Microscopy.

* cited by examiner

HTS BEARING SYSTEM AND METHOD

CROSS REFERENCE TO RELATED APPLICATIONS

This application is a continuation of U.S. patent application Ser. No. 14/140,224 filed Dec. 24, 2013, which claims the benefit of U.S. provisional patent application No. 61/844,766 filed Jul. 10, 2013.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and taught herein relate generally to bearing systems; and more specifically relate to bearing systems comprising high-temperature superconductors and applications thereof.

Description of the Related Art

Conventional bearing systems typically include various components that are mechanically coupled to one another, such as roller bearings disposed in a race. Such systems are subject to various limitations, including limitations due to friction. Lubricants, such as grease or oil, can be employed in an effort to reduce the unwanted effects of friction, such as the production of heat, but friction can nonetheless render conventional systems insufficient for certain applications. Consequently, many conventional movement systems are limited by friction, such as between the atmosphere and a body moving through it, or within the body itself, such as between bearings, gears or other components.

Examples of conventional applications that suffer from the limitations imposed by friction include transportation and transport systems, such as aircraft, trains, passenger vehicles (e.g., cars, trucks), and the like. Other examples would include virtually any machine having moving parts, such as a wheel turning about an axle or blades rotating about a support, generators, turbines and pulleys, among others. Further examples would include applications having other than rotating or spinning parts, such as linear motion applications. As a result of friction, such applications have certain limitations that may be perceived as drawbacks, such as limitations as to velocity, speed or rate of movement. For example, even when using existing air transportation, it can take many hours or even days to move from one destination to another. Travel between the same destinations may take even longer in a train or other vehicle.

At least some efforts have been made to reduce the effects of friction in various applications. For example, magnetic levitation vehicles, such as so-called "maglev" trains, offer an alternative to other forms of transportation, but are nonetheless generally not as fast as air travel. Maglev trains attempt to reduce friction between the train and the rail(s) along which it moves. However, it is well known that maglev trains are extraordinarily expensive. In fact, this expense could be prohibitive in at least some (e.g., large scale) potential maglev railway constructions. A significant cost in constructing maglev trains is the cost of the rails themselves because of the long distances that need to be traversed and the costs of the materials needed for the rail. In an effort to further reduce friction, travel can take place within an evacuated tube to reduce the friction caused by air. Proposals have been made to build maglev trains within evacuated tubes to eliminate the friction with air and potentially allow for travel at increased speeds. The problem remains, however, of the expensive and potentially prohibitive cost of building the rail upon which the maglev train would travel, due in part to the level of sophistication and intricacy of the rail itself (which typically must be maintained along the entire length of the rail).

Therefore, there is a need in the art for a reduced-friction bearing system useable for numerous applications, from simple mechanical systems requiring only basic movement (e.g., rotation about an axle or other axis, bicycles, basic machinery) to more complex movement systems such as vehicles, aircraft, turbines and complex machinery. For example, in the case of a maglev train, there is a need to eliminate the rail entirely (or at least the need for an HTS or magnetic rail), and create a system of transportation that utilizes a reduced-friction bearing system, such as for a reduced-friction wheel assembly.

It is an object of the present invention to at least partially alleviate one or more of the above-mentioned concerns. A further object of the present invention is to provide an at least reduced-friction bearing system that can be utilized in numerous applications. Additional objects of the present invention are to provide a commercially and economically viable manner of reducing friction in wheel bearing and other movement systems and to provide systems and methods in support of faster and more efficient travel. Another object of the present invention is to provide an at least reduced friction environment within a wheel system that supports a vehicle rather than between the vehicle and a track.

BRIEF SUMMARY OF THE INVENTION

This disclosure provides a superconductor-magnet bearing system that can include first and second bearing portions in movably coupled with one another. One of the first and second portions can be at least partially composed of one or more high-temperature superconductor ("HTS") materials. Another of the first and second portions can be at least partially composed of one or more magnets or other magnetic materials.

A superconductor-magnet bearing system can include a first bearing portion coupled to a support, which can be a first bearing portion having an outside dimension and an outer surface. The first bearing portion can, but need not, be fixed relative to the support. A system can include a second bearing portion having an opening and an inner surface, such as an opening having a dimension larger than an outside dimension of a first bearing portion. One of the first and second bearing portions can be at least partially composed of a high-temperature superconductor and another of the first and second bearing portions can be at least partially composed of a magnet or other magnetic material. A first bearing portion can be disposed at least partially within the opening of the second bearing portion. A gap can exist between a surface of the first bearing portion and a surface of the second bearing portion. A the bearing portion can be at least partially composed of HTS and a second bearing portion can be at least partially composed of a magnet, or vice versa.

A system can include a cooling system having a cooling assembly coupled to an HTS bearing portion. A cooling assembly can comprise a cryostat and a bearing portion can be at least partially disposed in the cryostat. At least a portion of a cooling assembly can be disposed in a gap or other space between a first bearing portion and a second bearing portion. A cooling system can include an interface portion configured for thermal communication, which can be disposed in communication with one or more bearing portions. Two or more bearing portions can be movably coupled to one another, which can include flux pinning and/or one or more other manners of coupling. One bearing portion can be adapted to rotate about another bearing portion. A gap or other space between bearing portions can be at least substantially uniform, and first and second bearing portions can be adapted so that a gap remains at least substantially uniform during movement of one or more bearing portions. At least one bearing portion can include a plurality of segments, pieces or other bearing portions.

A system can include a drive system, which can include one or more components for moving one or more bearing portions or other components of a system. A drive system can include a driver, such as a driver adapted to drive a driving portion, and a driven portion, which can be coupled to a bearing portion. A driving portion can be disposed next to or otherwise in relation to a driven portion, which can include being in physical contact or not being in physical contact. A driving portion can be coupled to a driven portion, and a driver can be adapted to move a driving portion and/or driven portion. A system can include one or more driving couplers and one or more driven couplers. One or more driving couplers and one or more driven couplers can be coupled in one or more combinations, which can define corresponding couplers or sets of couplers. A plurality of sets of driving couplers coupled to a driving portion and driven couplers coupled to a driven portion can include at least one driving coupler coupled to at least one driven coupler. A driving coupler and a driven coupler can be coupled to one or more of another mechanically, magnetically or otherwise. A driver can be a mechanical driver, a permanent magnet driver, an electromagnet driver, another driver, or a combination of any of them. As system can include an axle, one or more drive magnets and one or more driven magnets. A drive assembly can be disposed about an axis of a bearing portion and one or more drive magnets can communicate with one or more driven magnets. A drive assembly can rotate one or more drive couplers about a longitudinal axis, which can rotate one or more other couplers and/or structure coupled thereto.

A superconductor-magnet bearing system can include a bearing portion having a plurality of rings or other portions coupled or otherwise disposed next to one another, which can include being in contact or not being in contact. One or more bearing portions, such as rings, can have an inner portion and an outer portion, and each inner and outer portion can have a polarity, such as a magnetic polarity. An inner polarity can be different from an outer polarity. Two or more bearing portions, such as rings, located next to one another can have inner and/or outer polarities which can be different from one another. An HTS bearing portion can include one or more magnets, and a magnet bearing portion can include one or more magnets in addition to one or more other portions. As system can include one or more active or passive control systems, sensing systems, cooling systems or other systems. A method can include one or more methods of forming, assembling, making, using, implementing and/ or operating one or more superconductor-magnet bearing systems or portions of any of them. A method can include cooling one or more superconductor-magnet bearing systems or portions of any of them. A method can include coupling two or more superconductor-magnet bearing portions in a stable relationship and configuring at least one bearing portion to support a load. A method can include forming a bearing portion from a plurality of magnetic rings or other annular portions and coupling the bearing portion to an HTS bearing portion. A method can include controlling a relationship between two or more bearing portions using a magnetic control system, which can include an electromagnetic control system. A method can include moving one or more portions of a superconductor-magnet bearing system with a driver, which can include a magnetic driver.

DETAILED DESCRIPTION OF THE INVENTION

Figure 1:
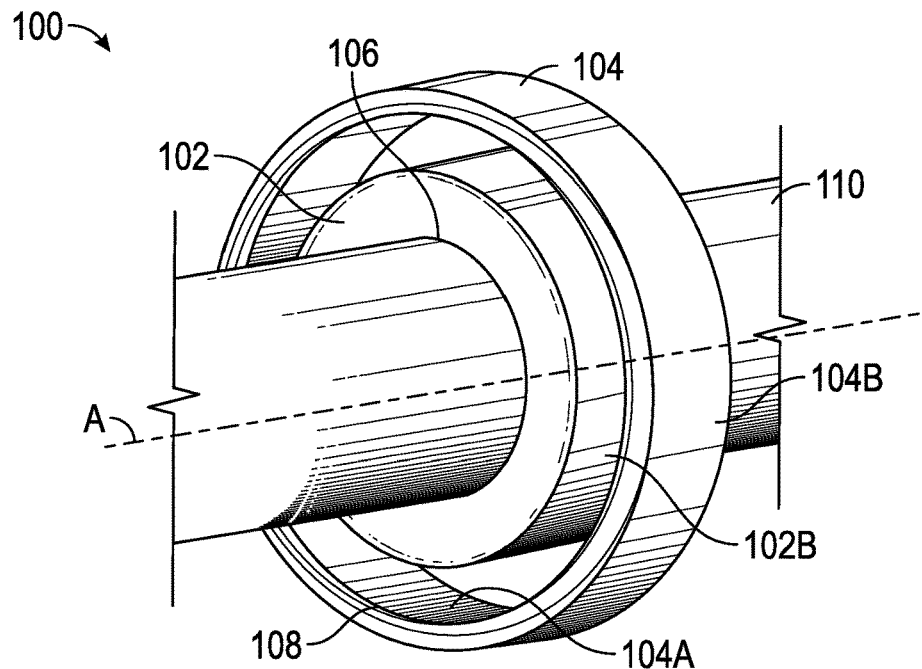
FIG. 1 illustrates an isometric view of one of many embodiments of a bearing system according to the disclosure.

The Figures described above and the written description of specific structures and functions below are not presented to limit the scope of what Applicant has invented or the scope of the appended claims. Rather, the Figures and written description are provided to teach any person ordinarily skilled in the art to make and use the invention for which patent protection is sought. Those skilled in the art will appreciate that not all features of a commercial embodiment of the invention are described or shown for the sake of clarity and understanding. Persons of skill in this art will also appreciate that the development of an actual commercial embodiment incorporating aspects of the present invention will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location, and from time to time. While a developer's efforts might be complex and time-consuming in an absolute sense, such efforts would be, nevertheless, a routine undertaking for those of ordinary skill in this art having benefit of this disclosure. It must be understood that the invention disclosed and taught herein is susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims. When referring generally to such elements, the number without the letter is used. Further, such designations do not limit the number of elements that can be used for that function. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally. The terms "including" and "such as" are illustrative and not limitative. The term "can" as used herein means "can, but need not" unless otherwise indicated. Each structure, component and other item included herein will have certain inherent physical characteristics when and if present in one or more physical embodiments of the present inventions, such as dimension(s) (e.g., height, width, length, diameter), mass, weight, imaginary axes, cross-sections and the like. It will be understood by a person of ordinary skill in the art that such characteristics are present, and that such items exist in one or more environments, regardless of whether expressly described or mentioned herein. The terms "reduced-friction," "low-friction" and similar terms as used herein refer generally to exhibiting or being subject to less friction than a conventional system (e.g., roller bearings) of similar application, such as a system that does not include HTS materials.

This disclosure provides an at least reduced-friction bearing system for supporting low-friction movement of one or more components. The bearing system can include one or more bearing portions, such as a magnetic bearing portion and a high-temperature superconductor ("HTS") bearing portion. One bearing portion can move relative to the other bearing portion, such as by rotating there about or otherwise relative thereto. Alternatively, a plurality of bearing portions can move relative to one another. At least one bearing portion can support a load, which can include being coupled to one or more supports. At least one bearing system according to the disclosure can support low-friction movement in a variety of applications, such as in a wheel assembly. A superconductor-magnet bearing system can include a first bearing portion and a second bearing portion. One of the first and second bearing portions can be at least partially composed of a high-temperature superconductor (HTS) and another can be at least partially composed of a magnet. The first bearing portion can be disposed at least partially within an opening of the second bearing portion with a gap between the first and second portions. A magnetic bearing portion can include a plurality of rings disposed next to one another. An HTS bearing portion can include a magnet. The bearing portions can be biased toward an alignment with one another. On bearing portion can rotate relative to another bearing portion.

Figure 2:
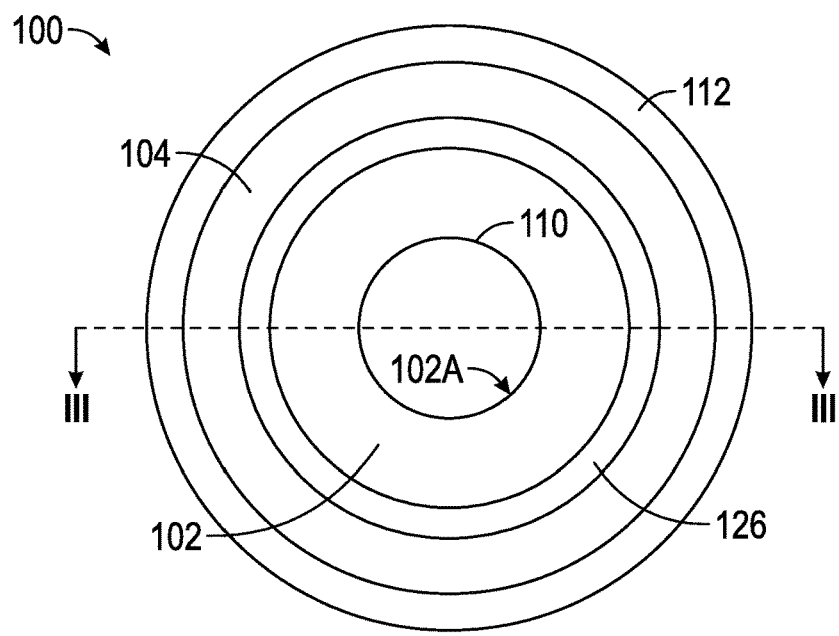
FIG. 2 is a side schematic view of the embodiment of FIG. 1.
Figure 3:
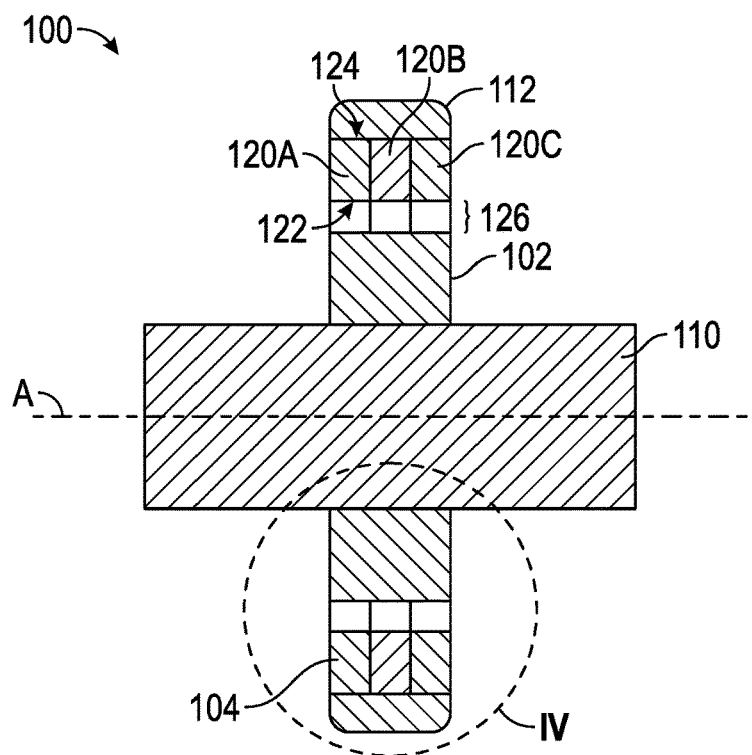
FIG. 3 is a cross-sectional top schematic view of the embodiment of FIGS. 1-2.
Figure 4:
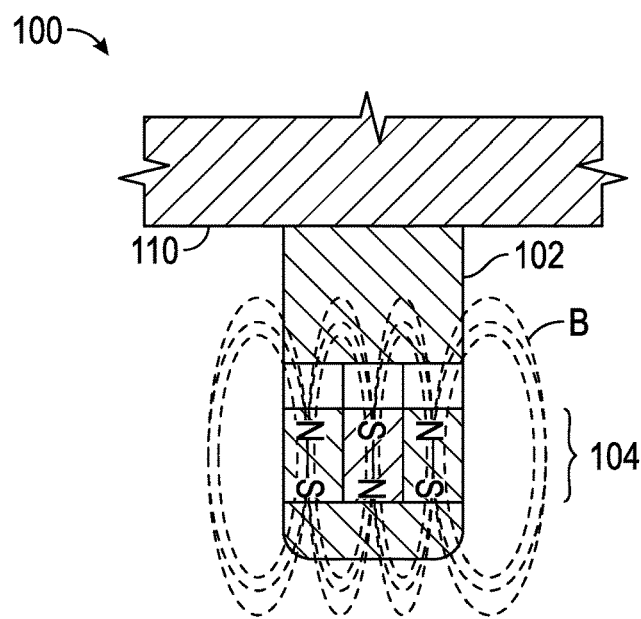
FIG. 4 is a detail schematic view of a portion of FIG. 3.
Figure 5:
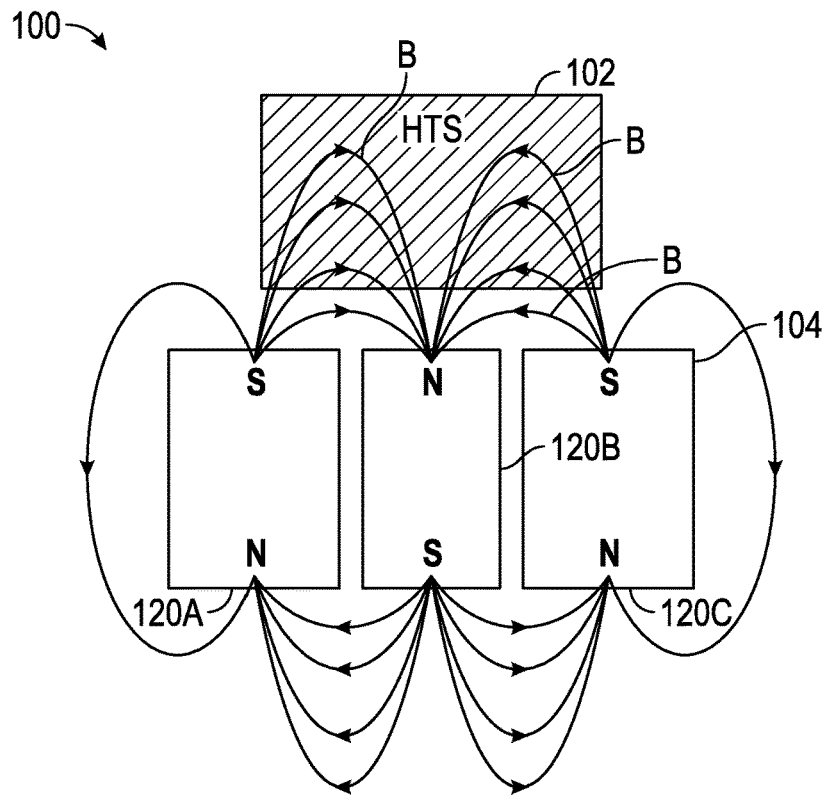
FIG. 5 is a partial cross-sectional schematic view of another of many arrangements of the embodiment of FIGS. 1-4 according to the disclosure.
Figure 6:
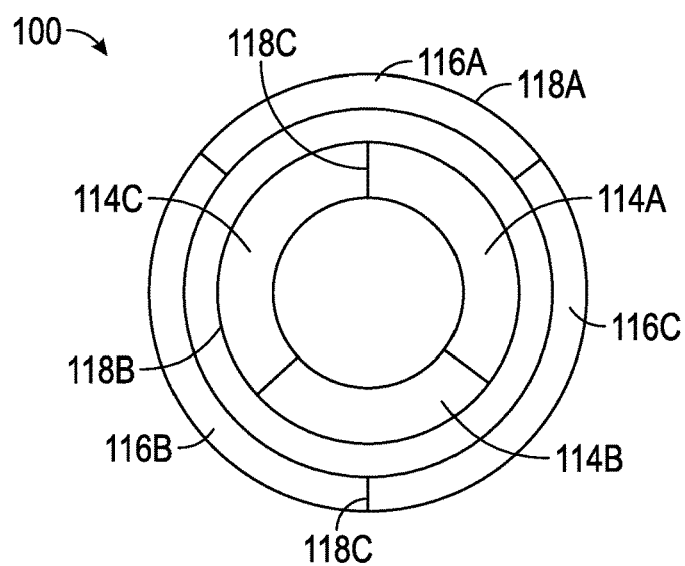
FIG. 6 illustrates a side schematic view of another of many embodiments of a bearing system according to the disclosure.
Figure 6A:
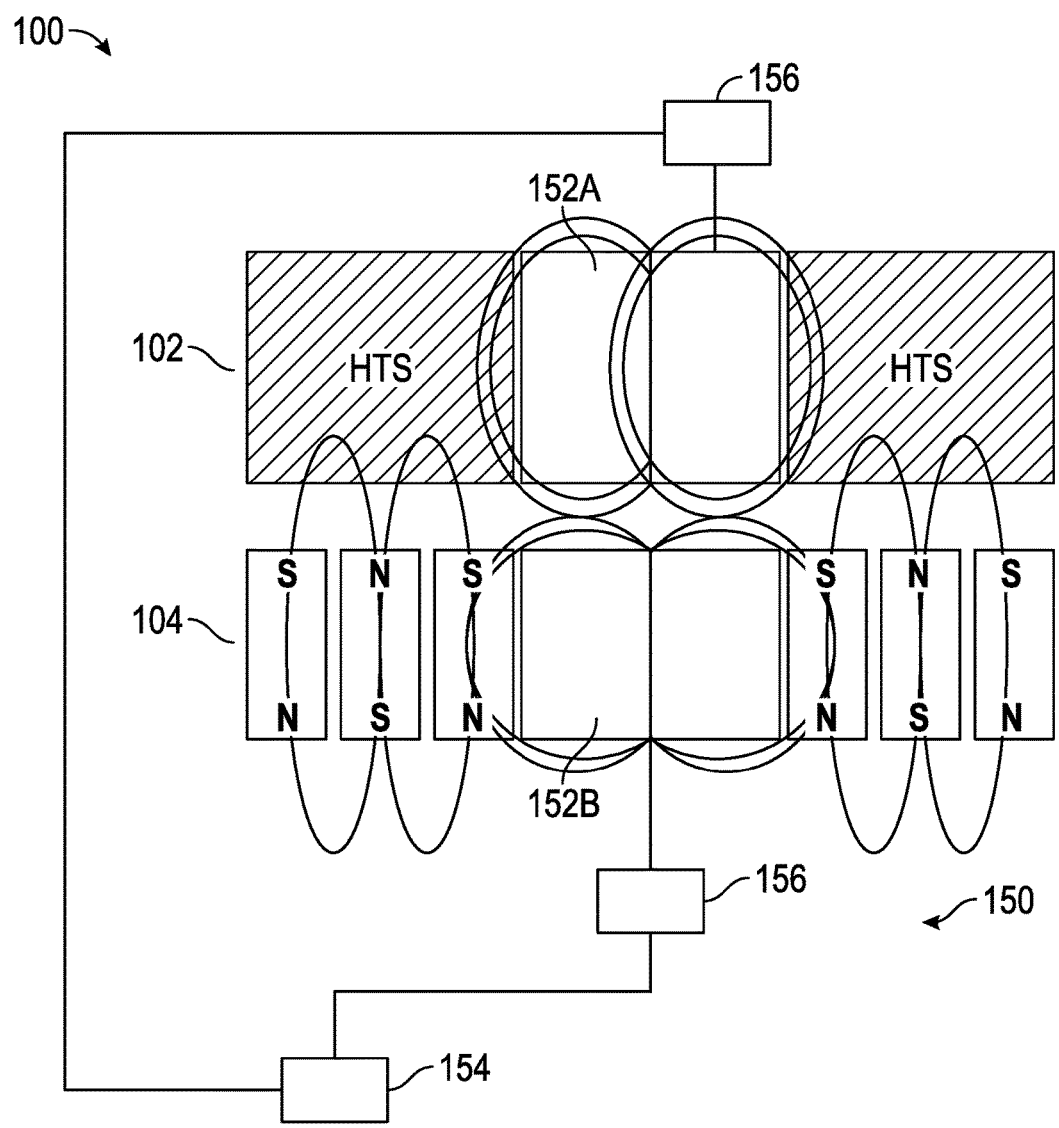
FIG. 6A is a partial cross-sectional schematic view of one of many embodiments of a bearing system having a control system according to the disclosure.
Figure 7:
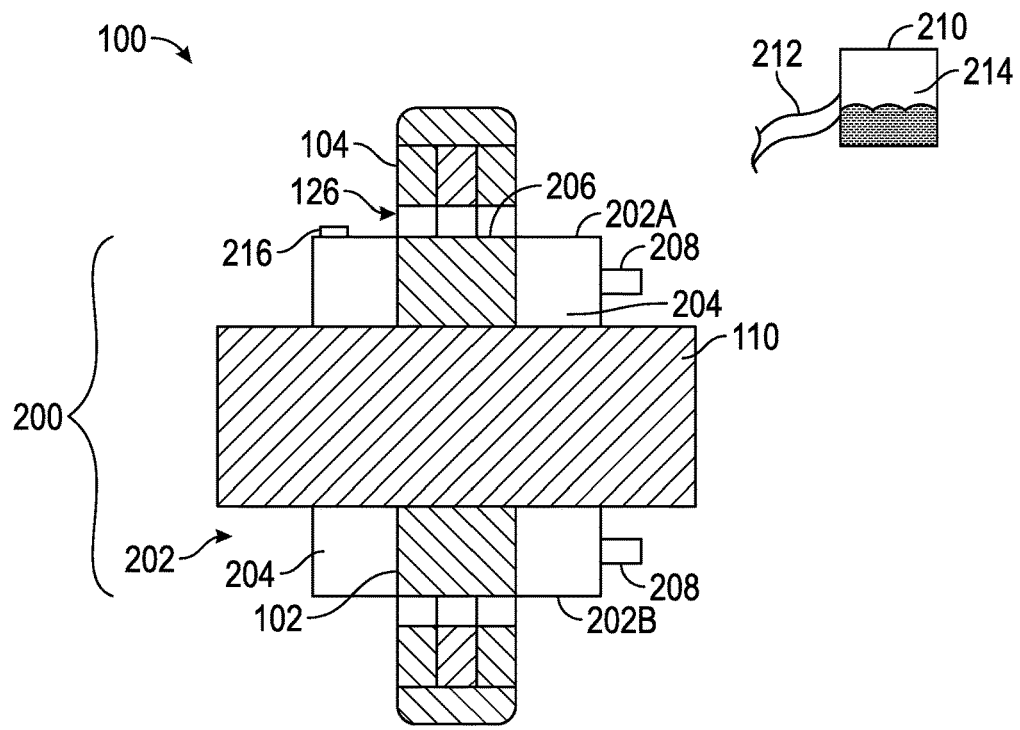
FIG. 7 illustrates a cross-sectional view of one of many embodiments of a bearing system having a cooling system according to the disclosure.
Figure 8:
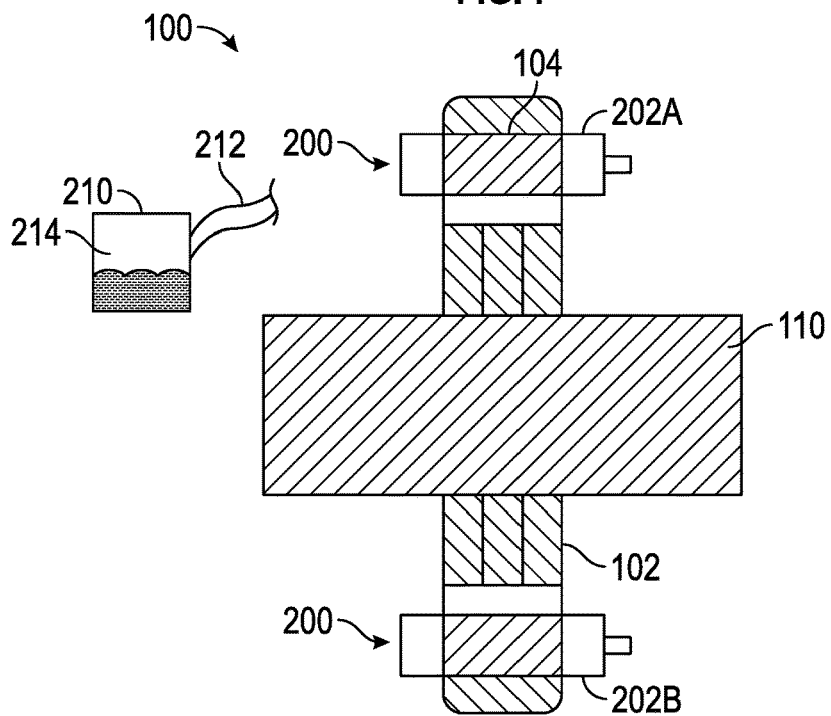
FIG. 8 illustrates a cross-sectional view of another of many embodiments of a bearing system having a cooling system according to the disclosure.

FIG. 1 illustrates an isometric view of one of many embodiments of a bearing system according to the disclosure. FIG. 2 is a side schematic view of the embodiment of FIG. 1. FIG. 3 is a cross-sectional top schematic view of the embodiment of FIGS. 1-2. FIG. 4 is a detail schematic view of a portion of FIG. 3. FIG. 5 is a partial cross-sectional schematic view of another of many arrangements of the embodiment of FIGS. 1-4 according to the disclosure. FIG. 6 illustrates a side schematic view of another of many embodiments of a bearing system according to the disclosure. FIG. 6A is a partial cross-sectional schematic view of one of many embodiments of a bearing system having a control system according to the disclosure. FIG. 7 illustrates a cross-sectional view of one of many embodiments of a bearing system having a cooling system according to the disclosure. FIG. 8 illustrates a cross-sectional view of another of many embodiments of a bearing system having a cooling system according to the disclosure. FIGS. 1-8 will be described in conjunction with one another. Bearing system 100 can include a plurality of bearing portions for supporting motion relative to one another, such as a first bearing portion 102 and a second bearing portion 104. First bearing portion 102, second bearing portion 104 and one or more other bearing portions may be referred to herein as "bearing portion" or simply "portion" followed by a corresponding reference numeral (e.g., "portion 102") for purposes of convenience and brevity. Bearing portions 102, 104 can be rotationally coupled to one another for allowing one portion to rotate relative to the other portion, as further described below. First and second portions 102, 104 can be cylindrical, which can include having a circular cross-sectional shape, or other cross-sectional shape, such as polyhedral. One or more of first and second portions 102, 104 can, but need not, be annular, ring shaped or tubular. For example, as shown in FIGS. 1-2 for illustrative purposes, first and second portions 102, 104 can have openings 106, 108 there through, respectively, such as central openings or holes. However, this need not be the case and, for example, portion 102 need not have an opening there through. Rather, portion 102 can have a solid cross-section, which can include being disk- or puck-shaped. First and second portions 102, 104 can be disposed about an axis A, such as a central longitudinal axis or other axis, which can be any axis required by a particular application, including an axis about which one or more of the bearing portions can rotate. Bearing portion 104 can have inner and outer surfaces, such as inside surface 104A and outside surface 104B. Similarly, portion 102 can have inner and outer surfaces (e.g., in an embodiment wherein portion 102 is annular), such as an inside surface 102A (see FIG. 2) and an outside surface 102B.

System 100 can include one or more supports 110 for holding or otherwise supporting one or more of first and second bearing portions 102, 104. For example, a bearing portion can be coupled to a support for at least partially supporting the respective bearing portion, separately or in combination with one or more other components. In at least one embodiment, which is but one of many, support 110 can be a shaft, rod, tube or other support (e.g., as described elsewhere herein), such as an axle, and bearing portion 102 can be coupled thereto. Portion 102 can be coupled to one or more supports, such as support 110, in any manner required by a particular application, which can, but need not, include the use of one or more couplers, such as fasteners, adhesives, or other couplers for holding one or more components in position. Alternatively, or collectively, portion 102 can be coupled to support 110 apart from the use of fasteners, including being force-fit thereto or formed integrally therewith, in whole or in part. With continuing reference to FIGS. 1-8, and specific reference to FIGS. 2-3, system 100 can include a housing 112 for at least partially covering or otherwise supporting one or more bearing portions. For example, housing 112 can be coupled to an outer portion of bearing portion 104, which can include at least a portion of outer surface 104B. In at least one embodiment, such as one or more of the embodiments described in further detail below, housing 112 can be or include one or more resilient members or other components for communicating or cooperating with other portions of a movement system, such as a transport or transportation system. For example, in at least one embodiment, which is but one of many, bearing system 100 can be at least a portion of a wheel assembly, wherein bearing portion 104 can be coupled to (including forming a portion of) a wheel and housing 112 can be or include a tire coupled to the wheel. In such an embodiment, bearing portion 104 and/or housing 112 can be configured to communicate with a supporting surface, such as a road or track, for movement there along. For example, outer surface 104B of bearing portion 104 (and housing 112, if present) can include a groove or notch for moving along a track, although this need not be the case and, alternatively, these components can be flat, curved, contoured or any other shape required by a particular application.

As illustrated, for example, in FIGS. 1-2 for exemplary purposes, bearing portions 102, 104 can, but need not, be annular and each can be comprised of a single body. However, this need not be the case and, alternatively, one or more of bearing portions 102, 104 can include one or more sub-portions, such as segments, sections or pieces, disposed relative to one another to form or approximate a ring or similar shape (see FIG. 6). For example, bearing portion 102 can include a plurality of sub-portions 114A, 114B, 114C ( . . . 114n) (collectively referred to as sub-portions 114), and bearing portion 104 can include a plurality of sub-portions 116A, 116B, 116C ( . . . 116n) (collectively referred to as sub-portions 116). If comprised of sub-portions in accordance with a particular embodiment, a bearing portion 102, 104 can include any number of sub-portions 114, 116, such as two, three, up to several dozen, or more. The number of sub-portions, if present, can depend on any number of implementation-specific factors, such as, for example, the availability of radially magnetized annular rings, the costs/benefits of using integral annular rings versus two or more ring segments or other portions, or other considerations. For instance, it can be time intensive and/or expensive to radially magnetize an integral ring and it can in at least one embodiment be easier and/or cheaper to approximate a radially magnetized annular ring by using arc segments that are approximately radially magnetized or a plurality of flat or otherwise shaped magnets arranged in the shape of a polyhedral that approximates a circle or ring shape. The segments or other portions can be magnetized, such as in the same radial direction, to form or approximately form one or more rings (a plurality of which can comprise system 120, or a bearing portion 102, 104, for example). Further, the sub-portions can be coupled to one another, such as by being disposed adjacent to one another (with or without a gap or other material there between), in any manner required by a particular application, which can, but need not, include the use of one or more couplers 118A, 118B, 118C (collectively referred to as coupler 118) for coupling one or more sub-portions to one another. Coupler 118 can be or include any type of coupler(s) required by a particular application, and can be coupled to two or more sub-portions in any manner, such as, for example, to the interior, exterior, or side of the sub-portions, separately or in combination. In at least one embodiment, which is but one of many, coupler 118 can include a substrate or substratum coupled along one or more sides of a plurality of adjacent sub-portions, which can, but need not, include a substrate coupled on both the inner and outer portions or surfaces of such sub-portions. Alternatively, or collectively, coupler 118 can include one or more couplers or portions thereof disposed between adjacent segments (e.g., couplers 118C).

With continuing reference to FIGS. 1-8, the composition and coupling of first and second bearing portions 102, 104 will now be described in further detail. Generally speaking, one of first and second bearing portions 102, 104 can be at least partially comprised of a superconductor, such as a high-temperature superconductor (aka "HTS" or "high-Tc") material, while the other of first and second bearing portions 102, 104 can be at least partially comprised of a magnetized material or magnet. For example, inner bearing portion 102 can include one or more HTS portions and outer bearing portion 104 can include one or more magnets. As another example, inner bearing portion 102 can include one or more magnets and outer bearing portion 104 can include one or more HTS portions. The terms "inner" and "outer" are used herein to refer to one or more of the exemplary embodiments (which are some of many) shown in the appended Figures for purposes of convenience and explanation and are not intended to be limitative. For example, in the exemplary embodiment of FIG. 1, bearing portion 102 may be referred to as the inner portion while bearing portion 104 may be referred to as the outer portion. Similarly, as described elsewhere herein, certain bearing portions (which can include any bearing portion) may include HTS material while other bearing portions (which can include any other bearing portion) may include one or more magnets (or magnetic material(s)); consequently, such portions respectively may be referred to herein as "HTS bearing portions" and "magnet (or magnetic) bearing portions" for convenience and clarity of purpose. An HTS bearing portion can be formed uniformly from a single HTS material, but need not be, and can alternatively be formed from a plurality of HTS materials in combination with one another and/or with one or more non-HTS materials. Similarly, a magnetic bearing portion can be formed uniformly from a single magnet material, but need not be, and can alternatively be formed from one or more magnet materials in combination with one another and/or with one or more non-magnet materials. While the magnetic bearing portion can be formed, for example, from one or more permanent magnets (e.g., rare earth magnets, other ferromagnetic materials, etc.), it need not be, and can alternatively be or include one or more electromagnets, separately or in combination with the permanent magnet(s).

System 100 can include bearing portions (e.g., first and second bearing portions 102, 104) comprising any type of HTS material suitable for a particular application, whether now known or developed in the future. For example, it is envisioned that materials capable of superconductive properties at higher (relative to presently known materials) transition temperatures may come to be known in the future, one or more of which may be suitable for utilization in at least one embodiment of the present invention. For instance, a material exhibiting superconductive properties at or near room or atmospheric temperature (e.g., in the range of about 0° F. to about 100° F.) could be useable for one or more embodiments of the present invention, considering of course one or more other implementation-specific factors such as mechanical properties or other factors that would be understood by a person of ordinary skill in the art having the benefits of the present disclosure. Examples of known HTS materials suitable for use in one or more embodiments of the present invention include, but are not limited to, Type II superconductors such as copper-oxide superconductors including $HgBa_2Ca_2Cu_3O_x$, $Bi_2Sr_2Ca_2Cu_3O_{10}$ (BSCCO) and $YBa_2Cu_3O_{(7-x)}$ (Yttrium-Barium-Copper-Oxide or YBCO), as well as iron-based superconductors including SmFeAs(O,F), CeFeAs(O,F) and LaFeAs(O,F). YBCO, for example, can be considered one of the most widely available and commonly used HTS materials at present. However, at least one embodiment of the present invention can include any superconductor having flux-pinning properties as described elsewhere herein. A specific type of YBCO known as "melt-textured" YBCO can be useful for some applications of the present inventions, for example, because it can allow the domains of the material to be oriented along the same direction, which can allow for relatively higher (relative to some other HTS materials) levitation forces in some circumstances. In this process, after YBCO is prepared, it is melted again with a "seed" material placed on it to direct the rest of the material (e.g., single crystals of MgO or $Sm_{123}$ can be used). An example of a process to synthesize melt-textured YBCO can be found in available literature (see, e.g., Litzkendorf, D. et al. Batch-processing and bonding of melt-textured applications YBCO for motor. 5107, 1-4 (1998)). Briefly, a commercial pre-reacted $YBa_2Cu_3O_{(7-x)}$ powder with an excess $Y_2O_3$ can be used. These materials can be mixed homogenously, such as with uniaxial pressing into cylindrical blocks. The blocks can be heated inside of furnaces using a melt-growth process (e.g., using a "seed" material as mentioned above), cooled down slowly, and finally oxygenated in a separate procedure. Alternatively, superconductors can be produced in differently shaped blocks, for example bars or other blocks having cross-sectional shapes such as square, rectangular, oval or oblong, among others. The lifetime of HTS can depend on the environment that it is in, and one or more conditions can lead to HTS degradation over time. For example, YBCO can react with the water, so humidity in the atmosphere or another environment can lead to the degradation of YBCO, such as when the humidity is greater than 40% (see, e.g., Roa, J. J. et al. Surface & Coatings Technology Corrosion induced degradation of textured YBCO under operation in high humidity conditions. *Surface & Coatings Technology* 206, 4256-4261 (2012)). However, even in such a case, the surface of a block of HTS can degrade prior to an internal portion, which can lead to the formation of a barrier that can slow down degradation of the remaining material. In an application such as levitation, for example, the properties of the bulk material can be more important than the surface, although this need not always be the case. In one study, YBCO exposed to water was observed to lose approximately 12.5% levitation force twenty hours after synthesis, but then to remain constant (see Sriram, M. A., Ponce, L. & Murr, L. E. Modeling superconductor degradation using magnetic levitation. *Applied Physics Letters* 58, 1208-1210 (1991)). Additionally, in this study they did not see any observable degradation of YBCO that was not exposed to humidity for a period of over a month (Id.). In order to help ensure the long time usefulness of the material, it can be protected from air and humidity, as described in further detail below. As another example, HTS materials can degrade when oxygen diffuses out of the material. In other words, the amount of oxygen in an HTS material can be important to the superconducting properties, so when oxygen diffuses out the material can become less superconductive over time. Oxygen can diffuse out more quickly when the material is heated up to relatively high temperatures. When the material is at relatively low temperatures (as presently can be needed for YBCO to be superconducting), the diffusion of oxygen out of the material can be at least partially suppressed (see, e.g., Truchlý, M. et al. Studies of YBa 2 Cu 3 O 6+x degradation and surface conductivity properties by Scanning Spreading Resistance Microscopy). Therefore, HTS degradation can be at least partially reduced, for example, in an environment that is both atmosphere-free (such as pure nitrogen or vacuum) and at relatively very low temperatures (such as that of liquid nitrogen). In the future, materials may be discovered which do not suffer (or at least suffer less) from one or more of the mentioned limitations. The HTS materials mentioned herein and other HTS materials can be used separately or in combination, whether with one another or with one or more other materials, as required by a particular application of the present invention.

Furthermore, system 100 can include bearing portions (e.g., first and second bearing portions 102, 104) comprising any type of magnet (e.g., magnetic or magnetized material) suitable for a particular application, whether now known or developed in the future. Examples of known magnets suitable for use in one or more embodiments of the present invention include, but are not limited to $Nd_2Fe_{14}B$ (Neodymium magnets) and $SmCo_5$ (Samarium-Cobalt alloy magnets). Other examples can include magnets made from alloys of iron with nickel, cobalt and/or aluminum, or other materials, such as titanium, copper and/or niobium, among others. Alternatively, or collectively, one or more electromagnets can be used. In an embodiment wherein the magnetic bearing portion is annular or similarly shaped (which can be either of bearing portions 102, 104, as explained in further detail elsewhere herein), the bearing portion (or one or more rings thereof) can be continuous or alternatively can be comprised of multiple segments, arcs or other sub-pieces. In the latter case, it can be advantageous in at least some embodiments for the segmented portion to approximate an unsegmented structure as closely as is practicable under the circumstances (considering factors such as cost, material availability, size, application, etc.), which can at least partially reduce a potential for non-uniformity of the radial magnetic field in the circumferential direction, and thus for resistance against rotation. However, this need not be the case, and varying magnitudes of resistance can be acceptable in one or more other embodiments or applications of Applicant's invention.

Turning to the coupling of the bearing portions, first and second bearing portions 102, 104 can be coupled to one another by way of magnetic communication between the HTS bearing portion (one of first and second bearing portions 102, 104) and the magnet bearing portion (the other of first and second bearing portions 102, 104). Such communication can be at least partially based on the properties of high temperature superconductors and magnets and the manners in which these materials interact with one another. More specifically, two effects that can be utilized in the present invention include the Meissner effect and flux-pinning. The Meissner effect can be referred to as the repulsion of magnetic flux lines from within a superconductor upon cooling down through its superconducting transition temperature ($T_C$) or, said differently, an expulsion of a magnetic field from a superconductor during its transition to the superconducting state. Magnetic field can be expelled upon cooling through the $T_c$. For Type II superconductors, there can be two critical magnetic fields, or $H_{c1}$ and $H_{c2}$. If the magnetic field present in a particular application is less than $H_{c1}$, it can be possible that no magnetic field may penetrate into the superconductor. If the magnetic field is between $H_{c1}$ and $H_{c2}$, the magnetic field can penetrate through certain portions of the material. Beyond $H_{c2}$, superconductivity can be at least partially suppressed, which can result in the material no longer being in a superconducting state. The term "flux-pinning" can refer to an effect exhibited by Type II superconductors (including HTS materials). Magnetic flux can be defined as the component of a magnetic field passing through a particular surface. Flux-pinning can occur, for example in Type II superconductors, because there are regions of the HTS material that are not superconducting and other regions that are superconducting. Because magnetic flux can pass through the former (non-superconductive) regions, but not the latter (superconductive) regions, a magnet can effectively be "pinned" in place relative to a corresponding HTS structure. This "flux-pinning" effect can, for example, allow a superconductor to levitate over a magnet, or vice versa. The load bearing capacity of the levitated component can depend at least partially on the surface areas of the respective components, among other factors, such as the quality or type of HTS materials used, or the critical field ($H_{c2}$) or critical current density ($J_c$), both of which can vary based on the type of HTS material.

With continuing reference to FIGS. 1-4, the present invention can include a disk- or ring-shaped first bearing portion 102 and an annular second bearing portion 104 rotatably coupled to the first portion, as further described below. In at least one embodiment, which is but one of many, first portion 102 can be the HTS portion and second portion 104 can be the magnet portion, or vice versa, and second bearing portion 104 can be magnetically coupled to portion 102 with a gap 126, such as a uniform, non-uniform, fixed, variable or other space, there between. In at least one embodiment, gap 126 can be adapted to allow one bearing portion to rotate about the other bearing portion without physical contact between the bearing portions. The bearing materials can alternatively have shapes other than disks and rings, as explained elsewhere herein. First portion 102 can be an HTS portion and can, for example, be a ring shape (or other shape having one or more openings there through). In such an embodiment, which embodiment is but one of many, a support 110 can be coupled with first portion 102, which can include being disposed in opening 106, and can be adapted to support cooling of the bearing portion. For example, support 110 (e.g., an axle, spindle or other support) can be comprised of at least partially of a heat-conductive material (e.g., copper, aluminum or another metal) and can be coupled in thermal communication with bearing portion 102 for removing heat there from. As another example, support 110 need not pass through bearing portion 102, and can be disposed partially therein or adjacent thereto while nonetheless remaining in a supporting and/or heat-transferring relationship. Portion 102 and support 110 can, but need not, be in direct contact with one another, and system 100 can include, for example, a heat transfer medium disposed at least partially there between (e.g., a heat transfer gel, gasket or other material).

As shown in FIGS. 3-4 for illustrative purposes, second bearing portion 104 can include a magnetic ring for coupling with an HTS first bearing portion 102 (alternatively, first bearing portion 102 can include a magnetic ring for coupling with an HTS second bearing portion 104). In at least one embodiment, which is but one of many, second bearing portion 104 (or first portion 102, as the case may be) can include a plurality of magnetic rings coupled to one another, such as 2, 3, 4, or up to 12 or more, which can include being disposed adjacently (whether or not in direct contact) to one another. As shown in the exemplary embodiment of FIGS. 3-4, bearing portion 104 (or portion 102; see, e.g., FIG. 8) can include three magnetic rings 120A, 120B, 120C (collectively, rings 120). However, this is just an example, and more or fewer rings can be used (including a single ring). Each ring 120 can be magnetized with one pole on a first side or surface, such as an inner surface 122, and one pole on a second side or surface, such as an outer surface 124. As explained elsewhere herein, in practice, one can alternatively magnetize multiple arc segments and couple them to at least approximate the magnetization of one or more of rings 120 (the term ring as used herein includes both unitary rings and segmented rings formed from a plurality of pieces, unless otherwise indicated). Rings 120 can be coupled to one another for creating a relatively large or increased gradient in the magnetic field in an axial direction, while maintaining a relatively uniform field in a circumferential direction, as illustrated, for example, by the magnetic flux lines B (simplified for purposes of clarity) shown in FIG. 4 (see also FIG. 5 described below). Variables such as gradient magnitude and field uniformity will of course be implementation specific, can vary from application to application, and can depend on any number of considerations according to an application, such as material types, magnet strength, magnet size, load bearing requirements, loading conditions, temperature and other factors (e.g., those discussed elsewhere herein), separately or in combination. The magnetic field uniformity of the magnets can be important, for example, because sharp gradients in a circumferential direction can cause a force in the HTS material that can effectively act like a friction (and hence be a source of energy loss), but rings 120 need not have perfect uniformity relative to one another. For example, at least one previous study has shown that even without a perfectly uniform magnetic field, the resulting torque due to the non-uniformity in the case of a superconductor-magnet interface is small and velocity independent (see Lee, E., Ma, K., Wilson, T. L. & Chu, W.-K. Superconductor-magnet bearings with inherent stability and velocity-independent drag torque. 1999 *IEEE/ASME International Conference on Advanced Intelligent Mechatronics* (1999)). Another study has looked into the effect of air gaps between magnets on the levitation force, and it found that for an air gap of 0.5 mm between the studied magnets, there is less than 1% variation in the levitation force at a levitation height of 15 mm. In other words, because the superconductor was separated by >10 mm from the surface of the magnets in the study, the superconductor did not easily "see" the magnetic field fluctuation in such a configuration (see Liu, M., Wang, S., Wang, J. & Ma, G. Influence of the Air Gap between Adjacent Permanent Magnets on the Performance of NdFeB Guideway for HTS Maglev System. *Journal of Superconductivity and Novel Magnetism* 21, 431-435 (2008)).

Turning back to the structure and arrangement of the present invention, system 100 can include a plurality of rings 120 arranged, for example, so that in an axial direction, the inner surfaces 122 are disposed N-S-N ("N" meaning north and "S" meaning south) and the outer surfaces 124 are disposed S-N-S (see, e.g., FIG. 4). As another example, rings 120 can be coupled so that inner surfaces 122 are disposed S-N-S and outer surfaces 124 are disposed N-S-N (see, e.g., FIG. 5). As illustrated by these two exemplary embodiments, which are but two of many, rings 120 can cooperate with one another to create a magnetic field gradient in an axial direction (i.e., in the horizontal direction as shown in FIG. 5) that at least partially resists or prevents axial movement of first and second bearing portions 102, 104 relative to one another (see, e.g., the simplified magnetic flux lines B of FIG. 5). Rings 120A and 120B (or "AB") and rings 120B and 120C (or "BC") can create respective forces in both directions (i.e., both left and right as shown in the exemplary embodiment of FIG. 5). When the HTS portion is moved (or subjected to a force that would tend to move it), for example, to the left (looking at FIG. 5), BC can bias or "pull" it back toward a central or other location relative to the magnet portion while AB can bias or "push" it back toward such location. Similarly, if the HTS portion is moved (or subjected to a force that would tend to move it) to the right (as shown in FIG. 5 for illustrative purposes), BC can "push" against such movement while AB can "pull" against such movement. This can occur because the HTS "wants" to maintain the same configuration of flux pinned within it. In other words, when the magnetic field moves relative to the HTS, the HTS can tend to move in a direction which can restore it to the previous configuration, such as a default configuration (e.g., it can go back to a central location over ring 120B in the case of FIG. 5). In this manner, the magnetic relationship of, for example, rings 120A and 120B, and rings 120B and 120C, respectively, can create forces that tend to bias bearing portion 104 toward a central (or other, as the case may be) position relative to bearing portion 102 (which is an HTS bearing portion in the example of FIG. 5), or vice versa.

The present invention can alternatively include other arrangements and numbers of rings. For example, system 100 can include a bearing portion 102, 104 having five rings with inner or outer surfaces in a S-N-S-N-S arrangement (the opposite surfaces being N-S-N-S-N) in an axial direction, or NSNSNSNSN (the opposite surfaces being SNSN-SNSNS), etc., among others. As another example, rings 120 can be disposed in an arrangement known as a Halbach array, which can help enhance the magnetic field on one side of the magnets. Other arrangements also can be used. For example, rings 120 need not be arranged N-S-N-S-N, etc., and alternatively can be coupled or otherwise disposed in other arrangements for creating an axial magnetic field gradient and a circumferential field uniformity sufficient to support a particular application (which can include gradients and uniformities of any magnitude or character), such as, e.g., Up, Right, Down, Left, Up. In such a configuration, the directions can refer to the direction of the north or south pole of a magnet. For example, the exemplary embodiment of FIG. 5, which is but one of many, can be described as north up, north right, north down, north left, north up.

Due to the effects of magnetic flux pinning, in magnetic field arrangements such as those described above for rings 120 for exemplary purposes, bearing portion 104 can rotate or spin in a circumferential direction relative to bearing portion 102 (e.g., about axis A), but can resist displacement in an axial direction (e.g., along axis A). The Meissner effect can maintain a force between the HTS and the magnet(s) in a radial direction, which can prevent the first and second bearing portions from contacting one another, such as while under a load (e.g., in a load in a direction perpendicular to axis A). The Meissner effect can become stronger as the bearing portions get closer to one another (or are subjected to radial forces that would tend to move them closer to one another), which can at least partially counteract such forces, while the flux-pinning effect can effectively bias the bearing portions toward a concentric position as shown in the Figures. In at least one embodiment of the present invention, the surface areas of the magnet and HTS bearing portions can be maximized, which can at least help maximize a load-bearing capacity of the bearing system. Such maximizations are of course application-specific, and can depend on any number of factors, such as size constraints, materials and cost constraints, among others, such as material fabrication methods, as will be understood by a person of ordinary skill in the art having the benefits of the present disclosure.

One or more embodiments of the present invention, such as one or more of those described above, can remain stable under one or more perturbations, as described in further detail elsewhere herein. Such embodiments may not require active feedback, such as from one or more sensors coupled to a controller, although such control and feedback systems can be included in at least one embodiment of the present inventions. For example, system 100 can include an active feedback or other control system 150 for monitoring or controlling one or more aspects of the system (see FIG. 6A). In such an embodiment, which is but one of many, one or more magnets, such as an annular magnet, can be embedded in or otherwise coupled to one or more bearing portions of the system (which could be any bearing portion, such as an HTS portion). A shown in FIG. 6A for exemplary purposes, a magnet (or plurality of magnets) 152A can be coupled to bearing portion 102 in such a way that it can interact repulsively with a magnet (or plurality of magnets) 152B in bearing portion 104. One or more of magnets 152A, 152B can be electromagnets, for example, and a repulsive interaction there between can be actively or otherwise modified by a controller 154, such as based on feedback or other data from one or more sensors 156 (e.g., pressure, voltage, current, magnetic field, force, temperature, or other sensors), separately or in combination. For example, control system 150 can be adapted to monitor and/or control one or more of magnets 152A, 152B (if present) based on one or more feedbacks, measurements or other inputs, such as for maintaining stability of the system. In at least one embodiment, a system 100 have a control system 150 can be adapted to modify the field strength of one or more of magnets 152A, 152B, such as, for example, to increase, decrease or otherwise control a load-bearing capacity or loaded configuration of the system. Of course, it will be understood that control system 150 need not be present in one or more other embodiments of the present inventions, and that system 100 can include one or more magnets 152A, 152B separate and apart from control system 150.

As explained above, system 100 can include a housing 112 coupled to bearing portion 104. In at least one embodiment, which is but one of many, housing 112 can be a tire or other structure for contacting a surface or object for movement relative thereto. Housing 112 can be comprised of any material required by a particular application, such as rubber, metal, carbon fiber, plastic, nylon, or another material suitable for contact with a surface that will be contacted. Housing 112 and bearing portion 104 can be coupled in any manner required by a particular application, which can include being coupled to one another by way of fasteners, adhesives, or other couplers, separately or in combination. Housing 112 and portion 104 can be resiliently coupled together so as to remain coupled in applications wherein bearing portion 104 can be subjected to relatively high rotational velocities. For example, in an embodiment wherein system 100 is utilized in a wheel assembly (as further described below), at 100,000 RPM, the total force that can be required to hold together a 7 kg wheel (weight not including the HTS, which is stationary) can be roughly 700,000 pounds. However, a material such as carbon fiber can have an ultimate tensile strength of roughly 3.5 GPa (and a Young's modulus far surpassing that), which can correspond to roughly 500,000 PSI. In such an embodiment, therefore, a "tire" having a cross-sectional area of several square inches can be sufficient to hold the wheel together during rotation. As stronger materials become available in the marketplace (such as carbon nanotubes), it is envisioned that the maximum potential RPM of a wheel assembly application utilizing the present invention will likely improve even further.

With continuing reference to FIGS. 1-8, and specific reference to FIGS. 7-8, system 100 can include a cooling system 200, which can be any type of cooling system required by a particular application, such as a heat removal or refrigeration system, for cooling one or more components of the bearing system. For example, cooling system 200 can at least partially maintain one or more HTS components at a temperature, or within a range of temperatures, sufficient to allow the HTS material(s) to exhibit superconductive properties (e.g., at or below the transition temperature or critical temperature at which the electrical resistivity of the material drops to zero). Cooling system 200 can be any one of many different types of cooling systems known in the art, separately or in combination, for maintaining a low temperature for a superconducting or other material. Alternatively, cooling system 200 can be specifically developed in accordance with particular applications of the present inventions. As examples, cooling system 200 can be or include a closed-cycle refrigeration system or a cryogenic fluid system, separately or in combination. For example, cooling system 200 can include a cryogenic fluid, such as liquid nitrogen, and one or more components of system 100 can be immersed in the cryogenic fluid. In such an embodiment (one of many), a cryogenic fluid can provide cooling power by evaporation. As another example, cooling system 200 can be or include a closed-cycle type refrigerator, which can include a fluid (e.g., a gas such as helium) having suitable heat transfer characteristics and can use processes of compression, heat exchange, and expansion to provide cooling power. For instance, cooling system 200 can be or include a so-called Gifford-McMahon cooler, which can include a compressor and a cold head (e.g., a cold plate) or other structure for cooling. In such an embodiment (one of many), one or more components of system 200 can, but need not, be disposed distally from one another, which can allow for more flexibility, as described in further detail below.

As mentioned above, cooling system 200 can, but need not, include at least a portion of one or more supports 110. For example, support 110 can be comprised at least partially of a thermally conductive material (e.g., copper or another metal) and can be disposed in thermal contact with one or more components of system 100, such as bearing portion 102. In an embodiment wherein bearing portion 102 includes HTS material(s), for example, support 110 can at least partially cool the HTS material by conduction. Alternatively, or collectively, cooling system 200 can include a cooling assembly 202 for cooling one or more components of system 100. Cooling assembly 202 can be any type of cooling assembly required by a particular application, including a device adapted to maintain relatively low temperatures within an internal portion 204 thereof for cooling material disposed therein or otherwise thermally coupled thereto. Internal portion 204 can be at least partially insulated from the surrounding environment, such as the atmosphere. Internal portion 204 can be at least partially adapted to resist heat transfer, for example by way of conduction, radiation or otherwise. Heat transfer from conduction (i.e., air molecules transferring heat through a wall of the cooling assembly) can, but need not, be at least partially limited by maintaining an at least partial vacuum within internal portion 204. Heat transfer by radiation can be at least partially minimized by utilizing so-called super-insulation, such as to reflect incoming radiation. For example, cooling assembly 202 (or portions thereof, such as internal portion 204) can include one or more super-insulating materials, such as polymer or other aerogels, and one or more super-insulating structures or techniques, such as double walls, separately or in combination. Cooling assembly 202 can be made from any material (or combination of materials) required by a particular application, such as metal, glass, plastic, fiberglass or another material. Cooling assembly 202 can, but need not, include one or more intervening portions 206 disposed at least partially within gap 126 between first and second bearing portions 102, 104. In such an embodiment, which is but one of many, intervening portion 206 can preferably be formed from a material that is not magnetized or which is otherwise adapted to at least minimize (or eliminate) any interference or effect on the coupling interaction between bearing portions 102, 104. For example, intervening portion 206 (if present) can be designed to occupy a minimal (e.g., in light of the requirements of a particular application at hand) amount of space between the HTS and magnet portions. In an embodiment wherein internal bearing portion 102 is the HTS bearing portion (see, e.g., FIG. 7), cooling assembly 202 can have one or more portions, such as a first portion 202A and a second portion 202B, coupled to bearing portion 102 for at least partially maintaining bearing portion 102 within a temperature range (e.g., a cryogenic temperature range). First and second portions 202A, 202B (and other portions, if present) of cooling assembly 202 can comprise a single cooling assembly structure or can be separate cooling assembly structures. In either case, first and second portions 202A, 202B can, but need not, be in fluid communication with one another, whether by way of being formed integrally with one another or otherwise, such as, for example, being fluidicly coupled to one another by way of one or more fluid passages, which can include any one or more of hoses, conduits, fittings, valves and other fluid communication structures required by a particular application. Cooling assembly 202 can include one or more openings 208, such as inlets, outlets or other passageways, for fluidicly communicating with one another or with one or more other components of system 100, separately or in combination. For example, system 100 can include one or more fluid sources 210 for supplying cooling fluid 214 to cooling assembly 202, such as via one or more fluid conduits 212, separately or in combination with one or more other fluid components (e.g., fittings, valves, and the like). In at least one embodiment, which is but one of many, cooling assembly 202 can be or include a cryostat that at least partially surrounds, houses, or is otherwise coupled to bearing portion 102 and/or support 110 (see, e.g., FIG. 7). In such an embodiment, fluid 214 can be a cryogenic fluid or cryogen, such as liquid nitrogen or another fluid, and fluid source 210 can provide fluid 214 to assembly 202 (including to one or more portions 202A, 202B) as needed to cool bearing portion 102 according to a particular application. Further, assembly 202 can, but need not, include one or more outlets 216, such as a vent, one-way or multi-way valve, check valve, or other passageway for allowing a fluid to escape from internal portion 204 of assembly 202. For example, outlet 216 can allow outgoing gas from an evaporated or evaporating liquid or other coolant to move out of assembly 202 or a portion thereof. As another example, one or more of first and second portions 202A, 202B of cooling assembly 202 can be or include a cold head disposed in a heat transfer relationship with at least a portion of bearing portion 102. In such an embodiment, one or more of first and second portions 202A, 202B can, but need not, be insulated from the environment, such as to perform a similar or same role as the cryostat in the liquid cryogen example, and fluid source 210 can circulate a coolant through assembly 202, including in and out of respective openings 208 (e.g., one or more inlets and one or more outlets). In another of many embodiments, wherein external bearing portion 104 is the HTS bearing portion (see, e.g., FIG. 8), first and second portions 202A, 202B can be thermally coupled to at least a portion of bearing portion 104. In such an embodiment, first and second portions 202A, 202B of cooling assembly 202 can, but need not, be separate from one another and can be coupled to bearing portion 104 in any location required by a particular application. As shown in FIG. 8 for exemplary purposes, first and second portions 202A, 202B can be coupled to one or more sides of bearing portion 104, or alternatively (or collectively) can be coupled to a top, bottom, inner or outer surface of bearing portion 104. Further, each of first and second portions 202A, 202B can, but need not, include a plurality of separate cooling portions, which can be in fluid and/or thermal communication with one another or alternatively can be fluidicly and/or thermally isolated. Otherwise, the illustrative arrangement of the cooling system 200 shown in FIG. 8 operates similarly to that described above with reference to FIG. 7 and thus need not be described again in detail here. In either case, or in other embodiments of Applicant's invention, cooling assembly 202 (or one or more portions thereof, such as portions 202A, 202B) can be well secured relative to a respective bearing portion for at least minimizing (or preventing) any movement relative to one another or to one or more other components of system 100. For example, cooling assembly 202 (or one or more portions thereof, such as portions 202A, 202B) can, but need not, be fixedly coupled to bearing portion 102, bearing portion 104, support 110, or another component of bearing system 100, separately or in combination, directly or indirectly. In an embodiment wherein a superconductor portion is disposed in a rotating bearing portion (e.g., bearing portion 104), a liquid cryogen method of cooling can be used, which can at least reduce an amount of weight (e.g., from system components) added to a rotating part of the system versus one or more other cooling systems. However, this need not be the case, and another cooling method may be useable for one or more applications of the present invention. In an embodiment wherein a superconductor portion is disposed in a rotationally or otherwise stationary part of system 100 (e.g., bearing portion 102), the addition of cooling system 200 components to a rotating portion of system 100 can be less of a concern, depending on the application. As will be readily understood by a person of ordinary skill in the at having the benefits of Applicant's disclosure, cooling system 200 can, and in at least some embodiments likely will, include numerous other cooling components, such as conduits, lines, hoses, fittings, valves, pumps, compressors, heat exchangers, evaporators, fins, tubes, and fans or other air movers, among others. Consequently, such items known in the art need not be described in detail herein. As other examples, cooling system 200 can, but need not, include one or more control systems, which can include one or more conventional (or custom developed) components, such as controllers, memory devices, control software, sensors, transmitters, receivers, thermometers, temperature sensors, pressure sensors, power sources, and other components for cooling system or control system applications. It will be appreciated that control system 150 described above (if present) can likewise include one or more of the foregoing components.

Having described above one or more embodiments of the systems and methods of the present inventions, one or more additional embodiments will now be described. A person of ordinary skill in the art having the benefits of the present disclosure will appreciate that one or more of the principles or aspects of the foregoing embodiments may likewise be applicable to one or more of the following embodiments. Consequently, certain aspects described above need not be, and may not be, repeated below.

Figure 9:
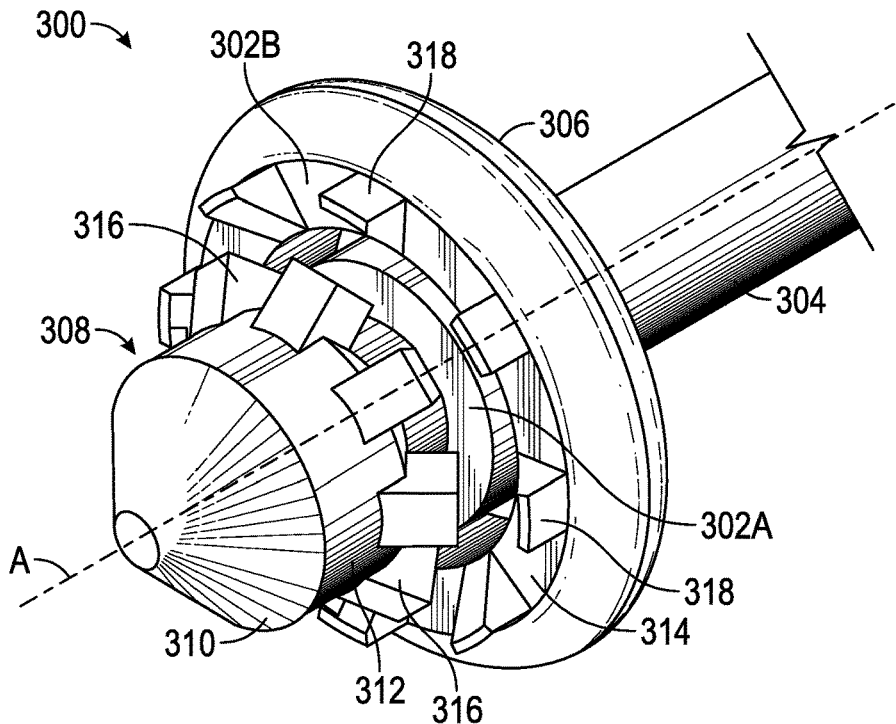
FIG. 9 illustrates an isometric view of one of many embodiments of a wheel assembly according to the disclosure.
Figure 10:
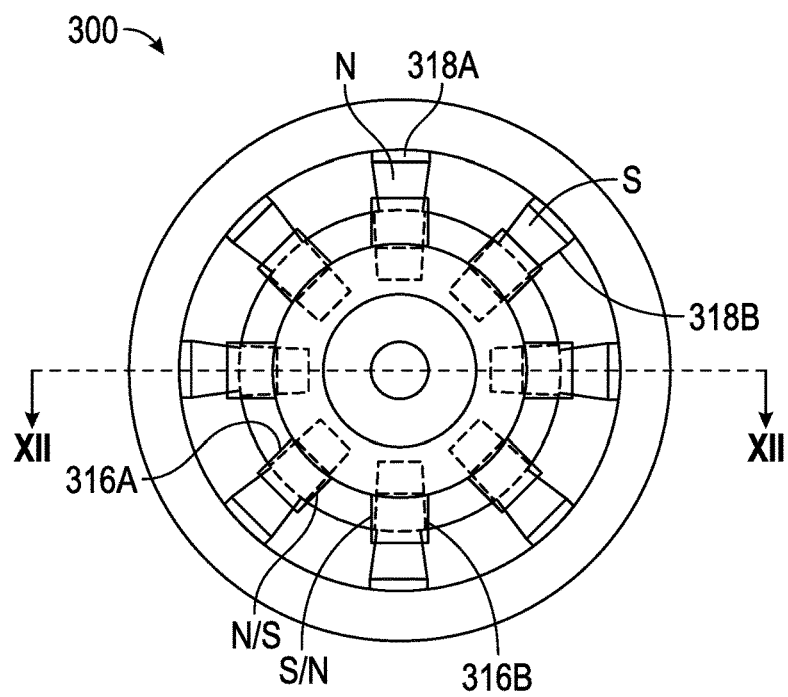
FIG. 10 is a side schematic view of the embodiment of FIG. 9.
Figure 11:
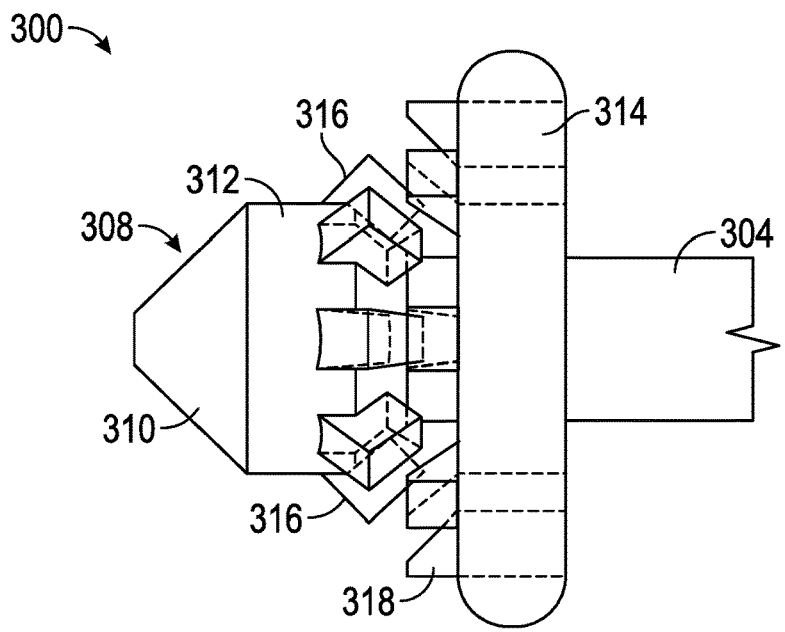
FIG. 11 is another side schematic view of the embodiment of FIG. 9.
Figure 12:
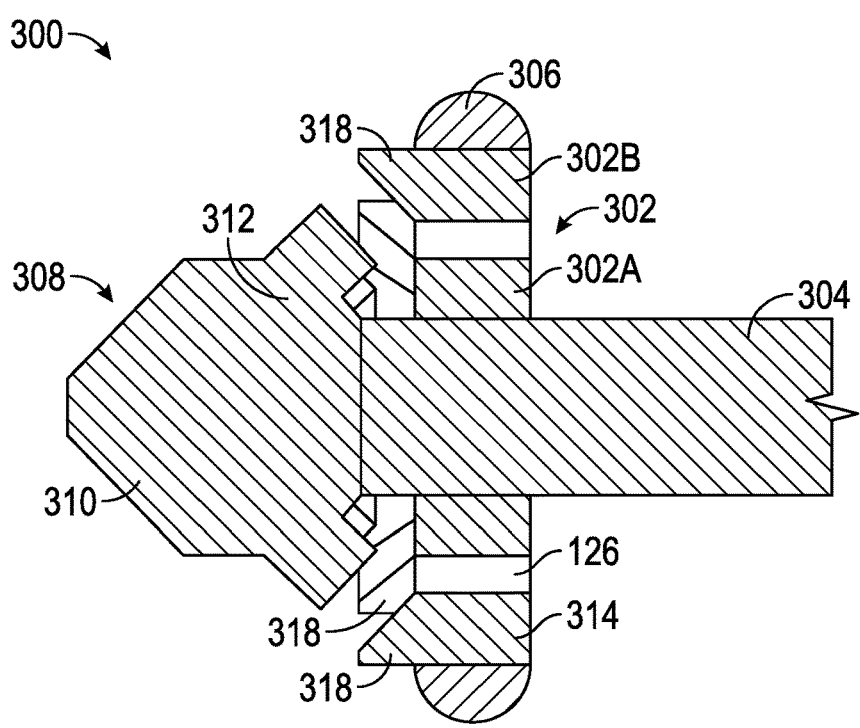
FIG. 12 is a cross-sectional top schematic view of the embodiment of FIGS. 9-11.

FIG. 9 illustrates an isometric view of one of many embodiments of a wheel assembly according to the disclosure. FIG. 10 is a side schematic view of the embodiment of FIG. 9. FIG. 11 is another side schematic view of the embodiment of FIG. 9. FIG. 12 is a cross-sectional top schematic view of the embodiment of FIGS. 9-11. FIGS. 9-12 will be described in conjunction with one another. In at least one embodiment of the present invention, a bearing system (such as one or more of the bearing systems described above) can be, or can be incorporated into, one or more systems or apparatuses for movement or for supporting movement. As one of many examples, a bearing system 300 can be or include a wheel assembly for supporting rotational movement, and can include a bearing 302 coupled to one or more other components for moving, such as one or more supports 304 for supporting one or more components of the assembly. Bearing 302 can include a first bearing portion 302A, such as an inner (or outer) bearing portion, and a second bearing portion 302B, such as an outer (or inner) bearing portion. As described elsewhere herein, one of bearing portions 302A, 302B can be an HTS bearing portion and the other bearing portion 302A, 302B can be a magnet bearing portion. Of course, it will be appreciated that either of bearing portions 302A, 302B can be the HTS portion while the other can be the magnet portion as required or desired for a particular application or implementation at hand. It will also be appreciated that the relational terms used herein (e.g., inner, outer, first, second, etc.) are used for clarity and convenience of explanation, and that each bearing portion 302A, 302B can, but need not, include a plurality of HTS and/or magnet portions, separately or in combination with one another and/or one or more other non-HTS or non-magnet portions (e.g., couplers, housings, covers, or other components). In the exemplary embodiment of FIG. 9 included for illustrative purposes (which is but one of many), portion 302A is shown to be the HTS portion and portion 302B is shown to be the magnet portion, but this need not be the case (as explained above and elsewhere herein). Bearing portion 302A can be coupled to support 304, which can be or include an axle, spindle, shaft, bar, rail or other structure, and which can, but need not, be adapted to rotate or otherwise move. Portion 302A and support 304 can be coupled in any manner required by a particular application, including directly, indirectly, being formed integrally, or in another manner, in whole or in part. Bearing portion 302B can be magnetically coupled to bearing portion 302A as explained elsewhere in this disclosure, such as with regard to bearing system 100 described above, and bearing portions 302A, 302B can be adapted to rotate relative to one another, singly or in combination. In at least one embodiment, portion 302B can be or include a wheel adapted to rotate about axis A, which can, but need not, be a central longitudinal axis of support 304. Bearing portion 302B can include an outer bearing portion 306, which can, but need not, include a tire, covering, housing, coating or other structure or surface (of any shape) adapted to contact a surface supporting system 300. Bearing portion 302B and outer portion 306 can be formed integrally or can be formed separately and otherwise coupled to one another, in whole or in part, which can, but need not, include the use of one or more fasteners, adhesives or other couplers.

In at least one embodiment, which is but one of many, a bearing system 300 can include a drive system 308 for moving one of bearing portions 302A, 302B relative to the other and/or one or more other components of the system. Drive system 308 can include a driver 310 for driving or otherwise causing or inducing one or more system components to move, such as rotationally or otherwise. Driver 310 can be coupled to support 304, but need not be and can alternatively (or collectively) be coupled to one or more other supports, or it can be self-supporting, for example. In at least one embodiment, driver 310 can be or include an electromagnetic driver (as further described below), but it need not be, and can be any type of driver required by a particular application, such as a mechanical, electrical, or electromechanical driving assembly. For example, driver 310 can be or include a rotating shaft, such as a drive shaft driven by a motor, engine, pump or other prime mover, or, as other examples, a transmission, PTO system, or drive linkage system. Drive system 308 can include a driving portion 312 coupled to driver 310, which can be adapted to move a driven portion 314. Driven portion 314 can include, for example, structure coupled to one or more bearing portions, such as to bearing portion 302B, including being formed integrally therewith, in whole or in part. Driving portion can, but need not, include one or more driving couplers 316; similarly, driven portion 314 can, but need not, include one or more driven couplers 318. Each of portions 312, 314 can include any number of couplers 316, 318 required by a particular application, one or more of which can be coupled to one another and to the respective driving portions in any manner suitable for an application at hand (including integrally), in whole or in part. For instance, each coupler 316, 318 can be coupled to one or more other like couplers, or alternatively each coupler 316, 318 can be separate; further, one or more couplers can be replaceable, such as by being removably coupled to one or more other components, such as a respective portion 312, 314. A driving portion 312 can have the same number (which can be any number) of driving portions 316 as a corresponding driven portion 314 has driven couplers 318; alternatively, system 300 can include different numbers of corresponding couplers 316, 318. One or more driving couplers 314 (if present) can be coupled to one or more driven couplers 318 (if present) for coupling driving portion 312 and driven portion 314 to one another. Alternatively (or collectively) one or more of driving and driven portions 312, 314 may not include couplers and one of the portions can be coupled to the coupler(s) of the other portion or, as another example, couplers 316, 318 can be absent altogether and drive portions 312, 314 can be coupled to one another without the use of couplers, such as directly or otherwise. In at least one embodiment, driving portion 312 can be mechanically coupled to driven portion 314, such as for rotating portion 314 about axis A. For example, one or more sets of corresponding couplers 316, 318 (including one or more sets of couplers) can be coupled to one another, removably or otherwise. While such an embodiment can be useful in one or more applications of Applicant's invention, it can nonetheless be subject to one or more limitations of a driver in the system (e.g., friction, maximum speed or rate, etc.). In at least one other embodiment, such as an embodiment including an electromagnetic or other magnetic driver (as mentioned above), driving portion 312 need not be mechanically coupled to driven portion 314. For example, driving portion 312 can be magnetically coupled to driven portion 314. In at least one of such embodiments, one or more corresponding or communicating sets (e.g., a pair or other combination) of driving, driven couplers 316, 318 (if present) can include a permanent magnet coupler and a magnetic coupler (which can, but need not, also be or include a magnet). The magnet coupler can be a driving coupler and the magnetic coupler can be a driven coupler, or vice versa, and such arrangement can, but need not, differ as between two or more sets of corresponding couplers (if present). Driving portion 312 can rotate (e.g., about axis A), such as by way of being rotated by driver 310 or a drive system coupled thereto, and the magnetic attraction between each set of corresponding couplers 316, 318 (or otherwise between driving portion 312 and driven portion 314) can cause bearing portion 302B to rotate or otherwise move along with driving portion 312. In at least one other of such embodiment, which yet again is but one of many, driving portion 312 (or driven portion 314) can be or include an electromagnet. For example, driving portion 312 can include one or more electromagnetic driving couplers 316 and driven portion 314 can include one or more magnetic driven couplers 318 having a corresponding driving coupler (or couplers) 316 associated therewith (or vice versa). In such an embodiment, each magnetic coupler can be polarized and each electromagnetic coupler can be adapted (separately or in combination) to cause a driven portion 314 (which may be either drive portion) to move, such as to rotate about an axis. As shown in FIG. 10 for illustrative purposes, in at least one of such embodiments, which is but one of many, driven portion 312 can, but need not, be disposed in a rotationally fixed position and driving portion can be or be coupled to a bearing portion 302B adapted to rotate about a bearing portion 302A, such as by being rotatably coupled thereto or there about. Two or more adjacent driven couplers 318 (if present), such as driven couplers 318A, 318B, can have alternating polarities, and driving couplers 316 can be adapted to change polarities during operation (e.g., in response to one or more elapsed times or another condition or instruction), such as to alternate between N and S polarities, for example. Adjacent driving couplers 316 (if present) can, but need not be adapted to alternate polarities in a manner opposite to one another. In other words, at a point in time (or for a period of time) during operation, which can be any point or period of time required by a particular application, one driving coupler (e.g., coupler 316A) (which can be any driving coupler, if present) can have a North polarity, and an adjacent driving coupler (e.g., coupler 318B) can have a South polarity, or vice versa. At a next point or period of time, the polarities of drive couplers can reverse or otherwise change to an opposite polarity (i.e., from N to S, or vice versa). Such a change can occur at any time or time interval, and any coupler position or relationship of coupler positions, required by a particular application. For example, in at least one embodiment, which is but one of many, such a change in polarities can occur at or around the time a driven coupler 318 reaches a position (e.g., a rotational or other position) that is midway between two adjacent driving couplers 316. As such, it will be appreciated and understood that an electromagnetic driver 310 can magnetically rotate a driven portion 314, for example, by way of controlled magnetic coupling therewith. More specifically, considering an example pair or other set of adjacent driving couplers (e.g., 316A, 316B) relative to a single example driven coupler (e.g., 318A or 318B) having a polarity of, for example, N, over an example period of time, one driving coupler 316 can have N polarity and the other driving coupler 316 can have S polarity. The N driving coupler can repel the driven coupler and the S driving coupler can attract the driven coupler. In this manner, the driven coupler can tend to move from a position near the former to a position near the latter. Over a subsequent period of time, the polarity of each driving coupler can reverse, and the example driven coupler can be biased accordingly, including toward a third example driving coupler adjacent to one of those mentioned above and, for example, having a polarity opposite that of the driven coupler at such time. Similar principles can be applied to the remaining couplers 316, 318 in an embodiment (if present) which can result in a driving force for driving driven portion 314 and/or second bearing portion 302B. Such a driving force can be controlled, for example increased or decreased, by controlling an amount of current flowing to or through one or more electromagnetic driving portions 312 and/or one or more driving couplers 316, if present. Furthermore, similar methods can be used to slow movement of a driven portion 314 if required or desired in a particular application, for example, as part of a braking system. System 300 can, but need not, include one or more other of the components disclosed herein, separately or in combination with one another, in whole or in part. For example, in at least one embodiment, system 300 can include a control system (not shown) adapted to measure, control, change, and/or display to a user one or more aspects or characteristics of the system. As another example, system 300 can include a cooling system (of which support 304, for example, can be a part), which can include a cooling assembly, cryogen, and/or other cooling equipment, such as one or more of the components shown in FIGS. 1-8.

Figure 13:
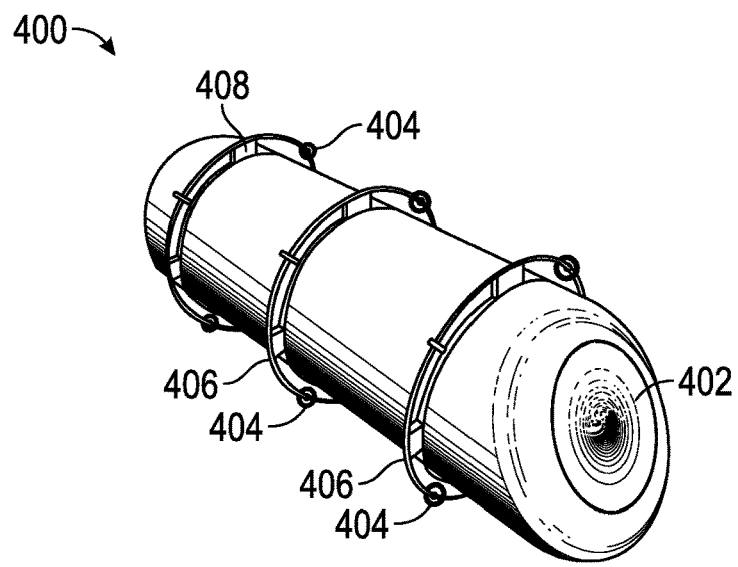
FIG. 13 illustrates an isometric view of one of many embodiments of a transport system according to the disclosure.
Figure 14:
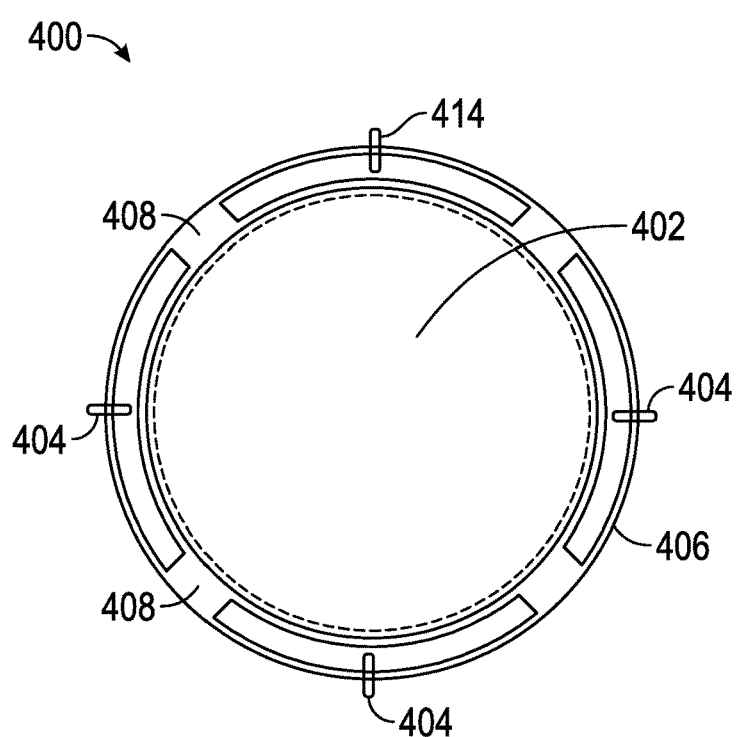
FIG. 14 is a schematic end view of the embodiment of FIG. 13.
Figure 15:
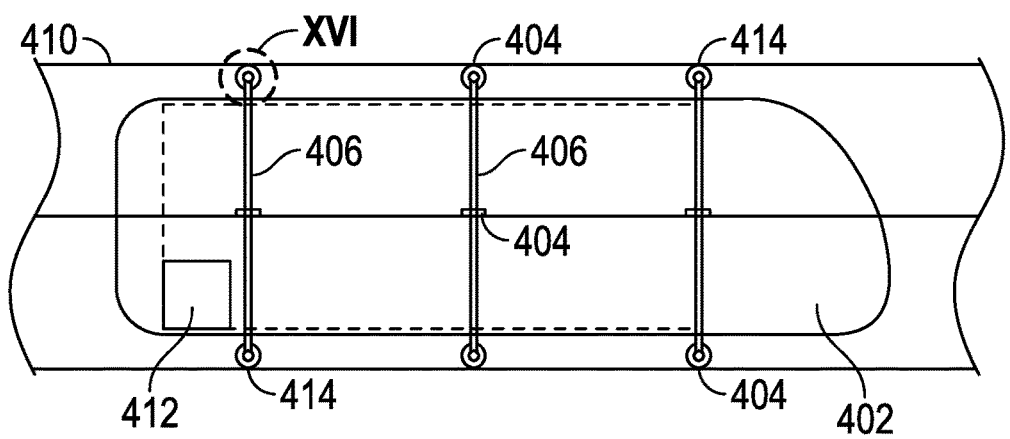
FIG. 15 is a side schematic view of the embodiment of FIGS. 13-14.
Figure 16:
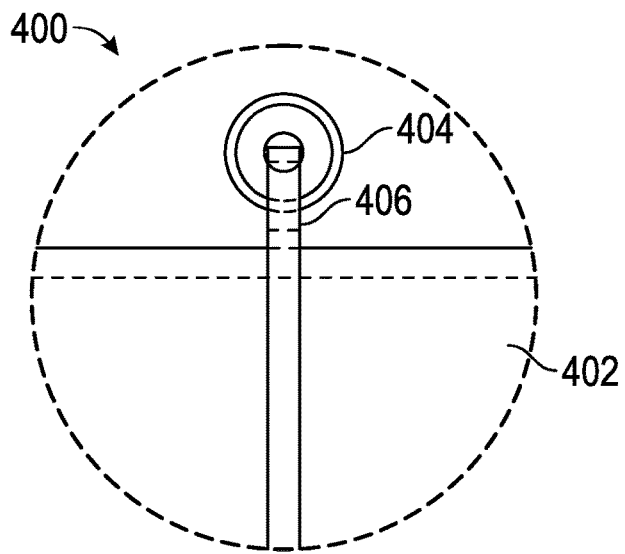
FIG. 16 is a schematic detail view of a portion of FIG. 15.

FIG. 13 illustrates an isometric view of one of many embodiments of a transport system according to the disclosure. FIG. 14 is a schematic end view of the embodiment of FIG. 13. FIG. 15 is a side schematic view of the embodiment of FIGS. 13-14. FIG. 16 is a schematic detail view of a portion of FIG. 15. FIGS. 13-16 will be described in conjunction with one another. In at least one embodiment of the present invention, a bearing system (such as one or more of the bearing systems described above) can be, or can be incorporated into, one or more transport (or transportation) systems 400, such as a system or apparatus for moving or supporting movement from one place to another. As one of many examples, a transport system 400 can include a body 402 for supporting one or more items (including passengers) being moved. Body 402 can include, for example, a vehicle body, chassis, frame or other structure for supporting items during movement, such as storage compartments and the like, separately or in combination with one another. Body 402 can be comprised of any materials required by a particular application, such as plastic, glass, metal and other materials, separately or in combination, and can include one or more of any of the features or other structures commonly found in conventional transportation systems, such as seating, safety mechanisms and other items, such as luxury items. Transport system 400 can include one or more bearing systems 404 coupled to body 402 for supporting movement thereof, which can include any number of bearing systems required by a particular application. For example, in one or more embodiments of the present inventions, system 400 can include two, three, four, five, six, eight, up to eighteen, or more or less, bearing systems according to Applicant's disclosure, such as a number of bearing systems similar to a number of wheels or tires found on one or more conventional transport systems, e.g., bicycles, motor cycles, passenger cars and trucks, semi-trucks and aircraft, among others. One or more of bearing systems 404 can be or comprise any of the bearing systems disclosed herein, in whole or in part, separately or in combination, including any application-specific implementation or adaptation of any of them. As such, bearing systems 404 need not be described again in detail here. One or more bearing systems 404 can be coupled or otherwise disposed at least generally beneath body 402, such as in a conventional vehicle arrangement, but this need not be the case. For example, as shown in the exemplary embodiment of FIGS. 13-16, which is but one of many, one or more bearing systems can be arranged on the top, bottom, side or another portion of a body 402 as required by or desired for a particular application, whether directly or indirectly. For instance, one or more bearing systems 404 can be coupled to a support 406, such as a frame, brace or other structure for supporting rotational movement of bearing systems 404, which can, for example, support linear, rotational or other movement of body 402. Support 406 can be circular, but need not be, and can alternatively be another shape, which can be any shape, such as square, rectangular or otherwise. One or more supports 406, each of which can include any number of bearing systems 404 required by a particular application (whether the same number or a different number), can be coupled to body 402 with one or more couplers 408, which can include, for example, braces, frames, fasteners or other structural members, separately or in combination. In at least one embodiment, which is but one of many, supports 406 and bearing systems 404 can be adapted and arranged to communicate with a track system 410 for directing or otherwise guiding the movement of system 400, such as by at least partially defining a path along which body 402 and/or other components of the system can travel. Track system 410 can include any type of guidance system required by a particular application, such as a track, one or more rails, cables or other support structures, or, as another example, an at least partially enclosed tube through which body 402 can pass. In an embodiment wherein track system 410 comprises a tube, which is but one of many, at least a portion of the tube can be at least partially evacuated of air, such as for maintaining the tube in an at least partial state of vacuum. In at least one embodiment, such as a vacuum tube embodiment, transport system 400 can, but need not, include a self-contained oxygen system, such as for providing breathable air to passengers aboard body 402. Transport system 400 can, but need not, include one or more prime movers 412 for propelling, forcing or otherwise moving body 402 (and any contents, if present) along a path. Prime mover 412 can include, for example, a hydrocarbon or otherwise powered motor or engine (which can including transmission, linkage, fuel and other components, as the case may be), or, as another example, prime mover 412 can comprise one or more jet propulsion systems, such as a rocket. Alternatively, prime mover 412 can be absent, and body 402 can move along a path in one or more other manners, such as by way of gravity or a magnetic propulsion system. In at least one embodiment, system 400 can, but need not, include one or more conventional bearing systems 414 in combination with one or more bearing systems according to the disclosure.

Figure 17:
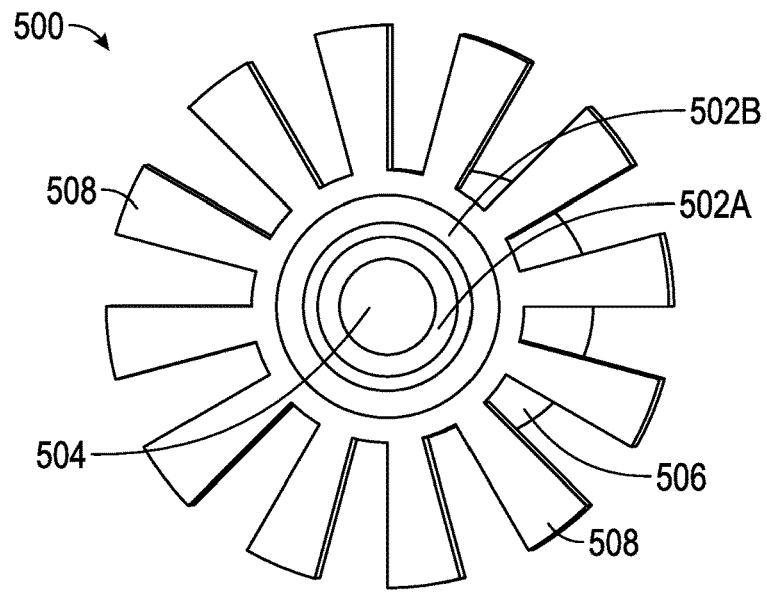
FIG. 17 illustrates an isometric view of one of many embodiments of a turbine system according to the disclosure.
Figure 18:
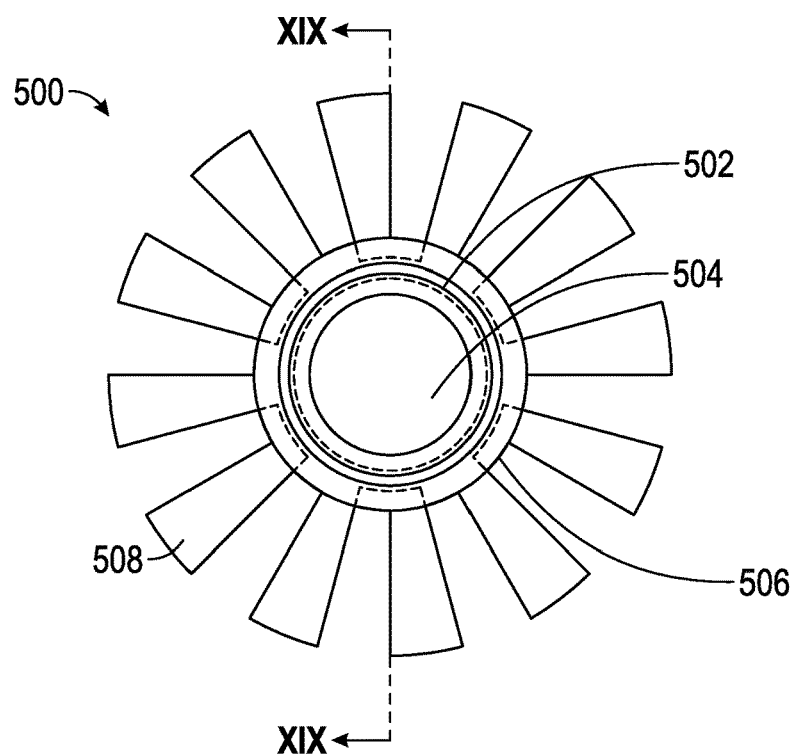
FIG. 18 is a schematic end view of the embodiment of FIG. 17.
Figure 19:
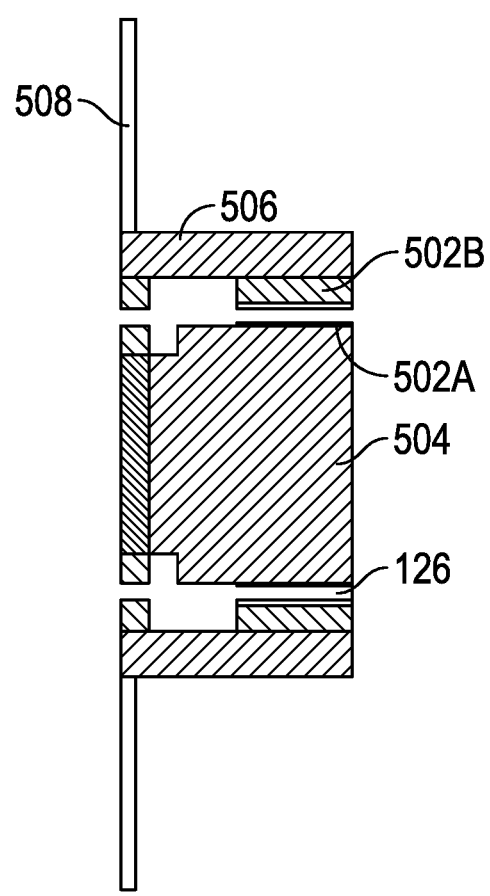
FIG. 19 is a cross-sectional schematic view of the embodiment of FIGS. 17-18.

FIG. 17 illustrates an isometric view of one of many embodiments of a turbine system according to the disclosure. FIG. 18 is a schematic end view of the embodiment of FIG. 17. FIG. 19 is a cross-sectional schematic view of the embodiment of FIGS. 17-18. FIGS. 17-19 will be described in conjunction with one another. In at least one embodiment of the present invention, a bearing system (such as one or more of the bearing systems described above) can be, or can be incorporated into, one or more turbine systems 500, such as a system or apparatus for generating electricity or another type of turbine. As one of many examples of an embodiment, a turbine system 500 can include one or more bearing systems 502 for supporting rotational movement between a support 504 and a fan 506. Each bearing system 502 can include one or more bearing portions, such as bearing portions 502A, 502B, which can include an HTS bearing portion and a magnet bearing portion as described elsewhere herein. One or more of bearing systems 502 can be or comprise any of the bearing systems disclosed herein, in whole or in part, separately or in combination, including any application-specific implementation or adaptation of any of them. As such, the bearing systems 502 of this embodiment of the present invention, which is but one of many, need not be described again in detail here. Support 504 can, but need not, be rotationally fixed, and fan 506, which can include one or more blades or fins 508, can rotate about support 504 with at least reduced friction relative to one or more conventional turbines that lack the bearing systems of the present inventions.

Other and further embodiments utilizing one or more aspects of the inventions described above can be devised without departing from the spirit of Applicant's invention. For example, the systems and methods disclosed herein can be used to support any type of movement, such as rotational, linear and the like. As another example, the systems and methods disclosed herein can be used to form one or more parts of other movement systems, which can include any movement system having conventional bearings, such as aircraft, passenger and other vehicles, machinery, heavy machinery, machining tools, generators, trailers, axles, actuators, or other movement systems. Further, the various methods and embodiments of the HTS-magnet bearing systems can be included in combination with each other to produce variations of the disclosed methods and embodiments. Discussion of singular elements can include plural elements and vice-versa. References to at least one item followed by a reference to the item may include one or more items. Also, various aspects of the embodiments could be used in conjunction with each other to accomplish the understood goals of the disclosure. Unless the context requires otherwise, the word "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by Applicant, but rather, in conformity with the patent laws, Applicant intends to fully protect all such modifications and improvements that come within the scope or range of equivalents of the following claims.

What is claimed is:

1. A superconductor-magnet bearing system, comprising:
a first bearing portion coupled to a support, the first bearing portion having an outside first dimension and an outer surface and being fixed relative to the support; and
an annular second bearing portion having an opening there through, a central longitudinal axis and an inner surface, the opening having a second dimension larger than the first dimension;
wherein one of the first and second bearing portions is at least partially composed of a high-temperature superconductor and includes a first magnet;
wherein another of the first and second bearing portions is at least partially composed of a second magnet and includes a third magnet;
wherein the first bearing portion is disposed at least partially within the opening through the second bearing portion so that a gap exists between the outer surface of the first bearing portion and the inner surface of the second bearing portion;
wherein the second bearing portion is configured to rotate about the longitudinal axis relative to the first bearing portion and support;
wherein the first magnet is configured to repel the third magnet so that the second bearing portion is biased toward a concentric position about the longitudinal axis; and
wherein the high-temperature superconductor and second magnet are configured to at least partially resist longitudinal movement of the second bearing portion.

2. The system of claim 1, further comprising a cooling system including a cooling assembly thermally coupled to the bearing portion that is at least partially composed of a high-temperature superconductor.

3. The system of claim 2, wherein the cooling assembly comprises a cryostat and wherein the bearing portion that is at least partially composed of a high-temperature superconductor is at least partially disposed in the cryostat.

4. The system of claim 2, wherein at least a portion of the cooling assembly is disposed in the gap between the outer surface of the first bearing portion and the inner surface of the second bearing portion.

5. The system of claim 1, further comprising a cooling system having an interface portion configured to remove heat, wherein the interface portion is disposed in thermal communication with the one of the first and second bearing portions that is at least partially composed of a high-temperature superconductor.

6. The system of claim 5, wherein the second bearing portion is at least partially composed of a high-temperature superconductor and the interface portion is disposed in thermal communication with the second bearing portion.

7. The system of claim 1, wherein the second bearing portion forms at least a portion of a wheel configured to roll along a surface supporting the system, and wherein the first and second bearing portions are configured to move simultaneously relative to the surface supporting the system.

8. The system of claim 7, wherein the gap between the outer surface of the first bearing portion and the inner surface of the second bearing portion is at least substantially uniform, and wherein the first and second bearing portions are configured so that the gap remains at least substantially uniform while the second bearing portion rotates about the first bearing portion.

9. The system of claim 1, further comprising:
a drive system including
a driver adapted to drive a driving portion mechanically coupled to the driver; and
a driven portion coupled to the second bearing portion;
wherein the driving portion is disposed longitudinally beside the driven portion along the central longitudinal axis;
wherein the driving portion is coupled to the driven portion; and
wherein the driver is adapted to move the driving portion to thereby move the driven portion.

10. The system of claim 9, further comprising:
a driving coupler coupled to the driving portion;
a driven coupler coupled to the driven portion; and
wherein the driving coupler and driven coupler are coupled to one another.

11. The system of claim 9, further comprising a plurality of corresponding sets of driving couplers coupled to the driving portion and driven couplers coupled to the driven portion, wherein each of the plurality of corresponding sets includes at least one driving coupler coupled to at least one driven coupler.

12. The system of claim 10, further comprising:
wherein the driving portion comprises an electromagnet configured to rotate about the central longitudinal axis of the second bearing portion, the driving couplers being coupled to the electromagnet;
wherein at least one of the driving couplers has a face disposed at an angle relative to the central longitudinal axis;
wherein at least one of the driven couplers has a face disposed at an angle relative to the central longitudinal axis, the face of the driven coupler being at least substantially parallel to, and spaced apart from, the face of the driving coupler; and
wherein the face of the driving coupler and the face of the driven coupler are magnetically coupled to one another.

13. The system of claim 9, wherein the driver is selected from the group consisting of a mechanical driver, a permanent magnet driver, an electromagnet driver and a combination thereof.

14. The system of claim 1, wherein the first bearing portion is at least partially composed of the high-temperature superconductor and includes the first magnet, and the second bearing portion is at least partially composed of the second magnet.

15. The system of claim 1, wherein the first bearing portion is at least partially composed of the second magnet, and the second bearing portion is at least partially composed of the high-temperature superconductor and includes the first magnet.

16. The system of claim 1, wherein at least one of the first and second bearing portions comprises a plurality of rings, at least one of the plurality of rings being comprised of a plurality of arc segments.

17. The system of claim 1, wherein the second bearing portion comprises an odd numbered plurality of radially magnetized rings including a middle ring and two end rings, wherein a polarity of the end rings is the same and a polarity of the middle ring is the opposite of the polarity of the end rings.

18. A superconductor-magnet bearing system, comprising:
a first bearing portion coupled to a support, the first bearing portion having an outside first dimension and an outer surface; and
an annular second bearing portion having an opening there through, a central longitudinal axis and an inner surface, the opening having a second dimension larger than the first dimension;
wherein the first bearing portion is at least partially composed of a high-temperature superconductor and includes a first magnet;
wherein the second bearing portion comprises a plurality of rings disposed adjacently to one another, each of the plurality of rings being at least partially composed of a second magnet and having a radially inner portion with an inner magnetic polarity that is different from an outer magnetic polarity of its radially outer portion;
wherein the second bearing portion comprises a third magnet;
wherein the first bearing portion is disposed at least partially within the opening through the second bearing portion and a gap exists between the outer surface of the first bearing portion and the inner surface of the second bearing portion;
wherein the first magnet is configured to repel the third magnet so that the second bearing portion is biased toward a concentric position about the longitudinal axis;
wherein the high-temperature superconductor and second magnet are configured to at least partially resist longitudinal movement of the second bearing portion; and
wherein the inner magnetic polarities of adjacent rings of the second bearing portion are different from one another.

19. The system of claim 18, further comprising:
wherein at least one of the first and third magnets is an electromagnet; and
a control system coupled to the electromagnet, wherein the control system is configured to selectively modify a field strength of the electromagnet to increase and decrease a repulsive force between the first and third magnets.

\* \* \* \* \*